US012340968B2

(12) United States Patent
Fishman et al.

(10) Patent No.: US 12,340,968 B2
(45) Date of Patent: Jun. 24, 2025

(54) THREE-DIMENSIONAL BEAM FORMING X-RAY SOURCE

(71) Applicant: Empyrean Medical Systems, Inc., Boca Raton, FL (US)

(72) Inventors: Kalman Fishman, Boca Raton, FL (US); Christopher W. Ellenor, Toronto (CA); Donald Olgado, Palo Alto, CA (US); Chwen-Yuan Ku, San Jose, CA (US); Tobias Funk, Martinez, CA (US); Petre Vatahov, San Jose, CA (US); Christopher R. Mitchell, Pleasanton, CA (US); Brian P. Wilfley, Sunnyvale, CA (US)

(73) Assignee: Empyrean Medical Systems, Inc., Boca Raton, FL (US)

( * ) Notice: Subject to any disclaimer, the term of this patent is extended or adjusted under 35 U.S.C. 154(b) by 0 days.

(21) Appl. No.: 18/598,616

(22) Filed: Mar. 7, 2024

(65) Prior Publication Data

US 2024/0266137 A1 Aug. 8, 2024

Related U.S. Application Data

(63) Continuation of application No. 18/074,705, filed on Dec. 5, 2022, now Pat. No. 12,027,341, which is a (Continued)

(51) Int. Cl.
*H01J 35/14* (2006.01)
*H01J 35/16* (2006.01)

(Continued)

(52) U.S. Cl.
CPC ............ *H01J 35/153* (2019.05); *H01J 35/16* (2013.01); *H01J 35/30* (2013.01); *H01J 35/32* (2013.01);

(Continued)

(58) Field of Classification Search
CPC .. H01J 35/14; H01J 35/16; H01J 35/32; H01J 35/30; H01J 35/153; H01J 35/12;

(Continued)

(56) References Cited

U.S. PATENT DOCUMENTS

| | | |
|---|---|---|
| 4,401,406 A | 8/1983 | Rovira |
| 5,422,926 A | 6/1995 | Smith et al. |

(Continued)

FOREIGN PATENT DOCUMENTS

| | | |
|---|---|---|
| CN | 101217913 A | 7/2008 |
| CN | 101505652 A | 8/2009 |

(Continued)

OTHER PUBLICATIONS

International Search Report mailed in PCT/US19/57191 on Feb. 19, 2020.

(Continued)

*Primary Examiner* — Jurie Yun
(74) *Attorney, Agent, or Firm* — Fox Rothschild LLP

(57) ABSTRACT

Systems and methods for generating X-ray photons. The methods comprise: generating an electron beam; positioning hollow pedestals in the path of the electron beam (the hollow pedestals being radially spaced apart from each other and extending out and away from a major planar face of a base plate); generating X-ray radiation as a result of an interaction of the electron beam with target element(s) disposed at a distal end of a respective pedestal of the hollow pedestals; causing the X-ray radiation to interact with a beam shield comprising wall elements extending out and away from the major planar face of the base plate; and setting at least one of a beam shape and direction of the X-ray radiation by selectively controlling a location where the electron beam intersects the target element(s) to determine an interaction of the X-ray radiation with the wall elements.

20 Claims, 20 Drawing Sheets

Related U.S. Application Data continuation of application No. 16/836,250, filed on Mar. 31, 2020, now Pat. No. 11,521,820, which is a continuation of application No. 15/941,547, filed on Mar. 30, 2018, now Pat. No. 10,607,802.

(60) Provisional application No. 62/479,455, filed on Mar. 31, 2017.

(51) Int. Cl.
*H01J 35/30* (2006.01)
*H01J 35/32* (2006.01)

(52) U.S. Cl.
CPC ... *H01J 2235/086* (2013.01); *H01J 2235/166* (2013.01)

(58) Field of Classification Search
CPC ................ H01J 35/13; H01J 2235/166; H01J 2235/086; H01J 2235/12; H01J 2235/1204; H01J 2235/1229; H01J 2235/1233; H01J 2235/1241; H01J 2235/1266; H01J 2235/1291
See application file for complete search history.

(56) References Cited

U.S. PATENT DOCUMENTS 5,621,214 A 4/1997 Sofield
5,635,709 A 6/1997 Sliski et al.
5,635,721 A 6/1997 Bardi et al.
6,144,875 A 11/2000 Schweikard et al.
6,207,952 B1 3/2001 Kan et al.
6,413,204 B1 7/2002 Winkler et al.
6,826,254 B2 11/2004 Mihara et al.
6,977,987 B2 12/2005 Yamashita et al.
7,005,623 B2 2/2006 Neuberger et al.
7,140,771 B2 11/2006 Leek
7,186,022 B2 3/2007 Charles, Jr. et al.
7,188,999 B2 3/2007 Mihara et al.
7,193,220 B1 3/2007 Navarro
7,200,203 B2 4/2007 Cocks et al.
7,201,715 B2 4/2007 Burdette et al.
7,239,684 B2 7/2007 Hara et al.
7,263,170 B2 8/2007 Pellegrino
7,266,176 B2 9/2007 Allison et al.
7,283,610 B2 10/2007 Low et al.
7,356,120 B2 4/2008 Main et al.
7,420,160 B2 9/2008 Delaperriere et al.
7,505,559 B2 3/2009 Kuduvalli
7,590,219 B2 9/2009 Maurer, Jr. et al.
7,605,365 B2 10/2009 Chen et al.
7,619,374 B2 11/2009 Aoi et al.
7,656,998 B2 2/2010 Main et al.
7,686,755 B2 3/2010 Smith et al.
7,693,257 B2 4/2010 Allison
7,713,205 B2 5/2010 Fu et al.
7,894,649 B2 2/2011 Fu et al.
7,902,515 B2 3/2011 Navarro
8,050,384 B2 11/2011 Carol et al.
8,126,114 B2 2/2012 Naylor et al.
8,139,714 B1 3/2012 Sahadevan
8,180,020 B2 5/2012 Kilby et al.
8,183,522 B2 5/2012 Celi de la Torre et al.
8,295,435 B2 10/2012 Wang et al.
8,303,476 B2 11/2012 Francescatti et al.
8,321,179 B2 11/2012 Simon et al.
8,332,072 B1 12/2012 Schaible et al.
8,520,801 B2 8/2013 Henning
8,559,596 B2 10/2013 Thomson et al.
8,559,598 B2 10/2013 Kindlein et al.
8,602,647 B2 12/2013 Navarro
8,655,429 B2 2/2014 Kuduvalli et al.
8,660,235 B2 2/2014 Koehler
8,792,613 B2 7/2014 Gardner et al.
8,804,901 B2 8/2014 Maurer, Jr. et al.
8,917,813 B2 12/2014 Maurer, Jr.
8,929,511 B2 1/2015 van der Veen et al.
8,934,605 B2 1/2015 Maurer, Jr. et al.
8,989,846 B2 3/2015 Kuduvalli et al.
8,995,616 B2 3/2015 van der Veen et al.
9,036,787 B2 5/2015 de Jager
9,040,945 B1 5/2015 Hayman
9,076,201 B1 7/2015 Negahdar et al.
9,108,048 B2 8/2015 Maurer, Jr. et al.
9,168,391 B2 10/2015 Henning et al.
9,289,268 B2 3/2016 Ramraj et al.
9,333,031 B2 5/2016 Salahieh et al.
9,415,239 B2 8/2016 Lubock et al.
9,561,009 B2 2/2017 Woudstra et al.
9,616,251 B2 4/2017 Filiberti et al.
9,724,066 B2 8/2017 Van Der Veen et al.
9,743,912 B2 8/2017 Fichtinger et al.
10,327,716 B2 6/2019 Mazin
10,350,437 B2 7/2019 Fishman
10,398,519 B2 9/2019 Kim et al.
10,607,802 B2 3/2020 Fishman et al.
10,646,726 B2 5/2020 Fishman
2001/0049475 A1 12/2001 Bucholz et al.
2002/0077545 A1 6/2002 Takahashi et al.
2002/0085668 A1 7/2002 Blumhofer et al.
2002/0136439 A1 9/2002 Ruchala et al.
2004/0218721 A1 11/2004 Chornenky et al.
2004/0227056 A1 11/2004 Neuberger et al.
2005/0078796 A1 4/2005 Leek
2005/0101824 A1 5/2005 Stubbs
2005/0111621 A1 5/2005 Riker et al.
2005/0276377 A1 12/2005 Carol
2006/0020195 A1 1/2006 Falco et al.
2006/0085053 A1 4/2006 Anderson et al.
2007/0076851 A1 4/2007 Pellegrino
2008/0009659 A1 1/2008 Smith et al.
2008/0170663 A1 7/2008 Urano et al.
2008/0198970 A1 8/2008 Kirshner et al.
2009/0161826 A1 6/2009 Gertner et al.
2009/0209805 A1 8/2009 Lubock
2009/0250618 A1 10/2009 Simon
2010/0030463 A1 2/2010 Tomizawa
2010/0040198 A1 2/2010 Comer et al.
2010/0237259 A1 9/2010 Wang
2010/0274151 A1 10/2010 Chi et al.
2011/0052036 A1 3/2011 Valdivieso Cacique et al.
2011/0105822 A1 5/2011 Roeder
2011/0257459 A1 10/2011 Sutton
2012/0014501 A1 1/2012 Pelc et al.
2012/0016175 A1 1/2012 Roberts et al.
2012/0037807 A1 2/2012 Ujhazy et al.
2012/0259197 A1 10/2012 Isham
2012/0294414 A1 11/2012 Koehler
2013/0025055 A1 1/2013 Saracen et al.
2013/0116555 A1 5/2013 Kuzelka
2013/0131428 A1 5/2013 Jiang et al.
2013/0217947 A1 8/2013 Fishman
2013/0231516 A1 9/2013 Loo et al.
2013/0345718 A1 12/2013 Crawford et al.
2014/0029727 A1 1/2014 Ono
2014/0054465 A1 2/2014 Berke
2014/0086388 A1 3/2014 Yamada et al.
2014/0105361 A1 4/2014 Vogtmeier et al.
2014/0121501 A1 5/2014 Fichtinger et al.
2014/0171919 A1 6/2014 Blacker
2014/0185778 A1 7/2014 Lee et al.
2014/0205067 A1 7/2014 Carol et al.
2014/0257013 A1 9/2014 D'Andrea
2014/0348288 A1 11/2014 Boyd et al.
2015/0265306 A1 9/2015 Andrews et al.
2015/0265353 A1 9/2015 Andrews et al.
2015/0265366 A1 9/2015 Andrews et al.
2015/0366546 A1 12/2015 Kamen et al.
2016/0106387 A1 4/2016 Kahn et al.
2016/0184032 A1 6/2016 Romo et al.
2016/0193482 A1 7/2016 Fahrig et al.
2017/0001939 A1 1/2017 Sookraj et al.
2017/0004267 A1 1/2017 Svatos et al.

(56) References Cited

U.S. PATENT DOCUMENTS

| | | | |
|---|---|---|---|
| 2017/0296289 | A1 | 10/2017 | Andrews et al. |
| 2017/0368369 | A1 | 12/2017 | Heinrich et al. |
| 2018/0015303 | A1 | 1/2018 | Fishman |
| 2018/0286623 | A1 | 10/2018 | Fishman et al. |
| 2019/0022418 | A1 | 1/2019 | Fishman |
| 2019/0060674 | A1 | 2/2019 | Fishman |
| 2019/0103869 | A1 | 4/2019 | Hannibal |
| 2020/0038691 | A1 | 2/2020 | Fishman et al. |
| 2020/0101325 | A1 | 4/2020 | Ollila et al. |
| 2020/0121957 | A1 | 4/2020 | Fishman et al. |

FOREIGN PATENT DOCUMENTS

| | | | |
|---|---|---|---|
| CN | 204951972 | U | 1/2016 |
| DE | 102010009276 | A1 | 8/2011 |
| JP | S50-011690 | A | 2/1975 |
| JP | S54111296 | A | 8/1979 |
| JP | S56022037 | A | 3/1981 |
| JP | S60-110121 | A | 6/1985 |
| JP | H06-500661 | A | 1/1994 |
| JP | 2005502160 | A | 1/2005 |
| JP | 2005516376 | A | 6/2005 |
| JP | 2009-142444 | A | 7/2009 |
| JP | 2011-518627 | A | 6/2011 |
| JP | 2012-138168 | A | 7/2012 |
| JP | 2014026801 | A | 2/2014 |
| JP | 2014-520363 | A | 8/2014 |
| JP | 2017-027873 | A | 2/2017 |
| KR | 100255723 | B1 | 5/2000 |
| KR | 10-2017-0019309 | A | 2/2017 |
| RU | 2013147424 | A | 4/2015 |
| RU | 2557466 | C2 | 7/2015 |
| WO | 9204727 | A1 | 3/1992 |
| WO | 2010030463 | | 3/2010 |
| WO | 2010065740 | A2 | 6/2010 |
| WO | 2017/044441 | A1 | 3/2017 |

OTHER PUBLICATIONS

International Search Report and Written Opinion dated Sep. 21, 2017 for PCT/US2017/041986.

International Search Report mailed on Nov. 26, 2018 in PCT/IB2018/055352.

Intemational Search Report mailed on Oct. 29, 2018 in PCT/US18/46663.

Extended European Search Report mailed on Jan. 31, 2020 in EP 17828486.5 filed Jan. 23, 2019.

Japanese Office Action dated Oct. 17, 2023 mailed in JP 2022-169632.

THREE-DIMENSIONAL BEAM FORMING X-RAY SOURCE

CROSS REFERENCE TO RELATED APPLICATIONS

This application is a continuation of U.S. patent application Ser. No. 18/074,705, filed on Dec. 5, 2022, which is a continuation of U.S. patent application Ser. No. 16/836,250, filed on Mar. 31, 2020, now U.S. Pat. No. 11,521,820 issued on Dec. 6, 2022, which is a continuation of U.S. patent application Ser. No. 15/941,547, filed on Mar. 30, 2018, now U.S. Pat. No. 10,607,802, issued on Mar. 31, 2020, which claims the benefit of U.S. Patent Provisional No. 62/479,455, filed on Mar. 31, 2017, the contents of which are hereby incorporated by reference in their entireties.

BACKGROUND

Statement of the Technical Field

The technical field of this disclosure comprises sources of X-ray electromagnetic radiation, and more particularly to compact sources of X-ray electromagnetic radiation.

Description of the Related Art

X-rays are widely used in the medical field for various purposes, such as radiotherapy. A conventional X-ray source comprises a vacuum tube which contains a cathode and an anode. A very high voltage of 50 kV up to 250 kV is applied across the cathode and the anode, and a relatively low voltage is applied to a filament to heat the cathode. The filament produces electrons (by means of thermionic emission, field emission, or similar means) and is usually formed of tungsten or some other suitable material, such as molybdenum, silver, or carbon nanotubes. The high voltage potential between the cathode and the anode causes electrons to flow across the vacuum from the cathode to the anode with a very high velocity. An X-ray source further comprises a target structure which is bombarded by the high energy electrons. The material comprising the target can vary in accordance with the desired type of X-rays to be produced. Tungsten and gold are sometimes used for this purpose. When the electrons are decelerated in the target material of the anode, they produce X-rays.

Radiotherapy techniques can involve an externally delivered radiation dose using a technique known as external beam radiotherapy (EBRT). Intraoperative radiotherapy (IORT) is also sometimes used. IORT involves the application of therapeutic levels of radiation to a tumor bed while the area is exposed and accessible during excision surgery. The benefit of IORT is that it allows a high dose of radiation to be delivered precisely to the targeted area, at a desired tissue depth, with minimal exposure to surrounding healthy tissue. The wavelengths of X-ray radiation most commonly used for IORT purposes correspond to a type of X-ray radiation that is sometimes referred to as fluorescent X-rays, characteristic X-rays, or Bremsstrahlung X-rays.

Miniature X-ray sources have the potential to be effective for IORT. Still, the very small conventional X-ray sources that are sometimes used for this purpose have been found to suffer from certain drawbacks. One problem is that the miniature X-ray sources are very expensive. A second problem is that they have a very limited useful operating life. This limited useful operating life typically means that the X-ray source must be replaced after being used to perform IORT on a limited number of patients. This limitation increases the expense associated with IORT procedures. A third problem is that the moderately high voltage available to a very small X-ray source may not be optimal for the desired therapeutic effect. A fourth problem is that their radiation characteristics can be difficult to control in an IORT context such that they are not well suited for conformal radiation therapy.

SUMMARY

This document concerns a method and system for controlling an electron beam. The method involves generating an electron beam and positioning a target element in the path of the electron beam. X-ray radiation is generated as a result of an interaction of the electron beam with the target element. The X-ray radiation is caused to interact with a beam-former structure disposed proximate the target element to form an X-ray beam. At least one of a beam pattern and a direction of the X-ray beam is controlled by selectively varying a location where the electron beam intersects the target element so as to determine an interaction of the X-ray radiation with the beam-former structure.

The location where the electron beam intersects the target element can be controlled by steering the electron beam with an electron beam steering unit. According to one aspect the steered electron beam can be guided through an elongated length of an enclosed drift tube. The drift tube is maintained at a vacuum pressure to minimize attenuation of the electron beam. The electron beam is permitted to interact with the target element after it passes through the drift tube.

According to one aspect, certain operations associated with X-ray beam control are facilitated by absorbing a portion of the X-ray radiation with the beam-former structure. For example, the location where the electron beam intersects the target element can be varied or controlled to indirectly control the portion of the X-ray beam that is absorbed by the beam-former. In some scenarios disclosed herein, the beam former can include at least one shield wall. The shield wall can be arranged to at least partially divide the target element into a plurality of target element segments or sectors. Further, the one or more shield walls can be used to form a plurality of shielded compartments. Each such shielded compartment can be arranged to at least partially confine a range of directions in which the X-ray radiation is emitted when the electron beam intersects the target element sector or segment that is associated with the shielded compartment.

From the foregoing it will be understood that the method can involve controlling the beam direction and form by controlling the electron beam so that it selectively intersects the target element in one or more of the target element sectors. The beam pattern can be further controlled by selectively choosing the location where the electron beam intersects the target element within a particular one of the target element sectors. According to a further aspect, the method can involve selectively controlling an X-ray dose delivered by the X-ray beam in one or more different directions by selectively varying at least one of an EBG voltage and an electron beam dwell time used when the electron beam intersects one or more of the target element sectors.

This document also concerns an X-ray source. The X-ray source is comprised of an electron beam generator (EBG) which is configured to generate an electron beam. A target element is disposed at a predetermined distance from the EBG and positioned to intercept the electron beam. A drift tube is disposed between the EBG and the target element. The EBG is configured to cause the electron beam to travel through an enclosed elongated length of the drift tube maintained at a vacuum pressure.

The target element is formed of a material responsive to the electron beam to facilitate generation of X-ray radiation when the electron beam intercepts the target element. A beam former structure is disposed proximate to the target element and comprised of a material which interacts with the X-ray radiation to form an X-ray beam. An EBG control system selectively controls at least one of a beam pattern and a direction of the X-ray beam by selectively varying a location where the electron beam intersects the target element. In some scenarios disclosed herein, the EBG control system is configured to selectively vary the location where the electron beam intercepts the target by steering the electron beam with an electron beam steering unit.

The beam former is comprised of a high-Z material which is configured to absorb a portion of the X-ray radiation to facilitate formation of the X-ray beam. The EBG control system is configured to indirectly control the portion of the X-ray beam that is absorbed by the beam-former by selectively varying the location where the electron beam intersects the target element.

According to one aspect, the beam-former is comprised of at least one shield wall. The one or more shield walls are arranged to at least partially divide the target element into a plurality of target element sectors or segments. As such the one or more shield walls can define a plurality of shielded compartments. Each shielded compartment is configured to at least partially confine a range of directions in which the X-ray radiation can be radiated when the electron beam intersects the target element sector associated with the particular shielded compartment.

With the X-ray source described herein, the EBG control system can be configured to determine the direction of the X-ray beam by controlling which of the plurality of target element sectors is intersected by the electron beam. The EBG control system is further configured to control the beam pattern by selectively controlling the location within one or more of the target element sectors where the electron beam intersects the target element. According to a further aspect, the EBG control system is configured to selectively control an X-ray dose delivered by the X-ray beam in one or more different directions defined by the target element sectors. It achieves this result by selectively varying at least one of an EBG voltage and an electron beam dwell time which are applied when the electron beam intersects one or more of the target element sectors.

BRIEF DESCRIPTION OF THE DRAWINGS

This disclosure is facilitated by the following drawing figures, in which like numerals represent like items throughout the figures, and in which.

DETAILED DESCRIPTION

Figure 1:
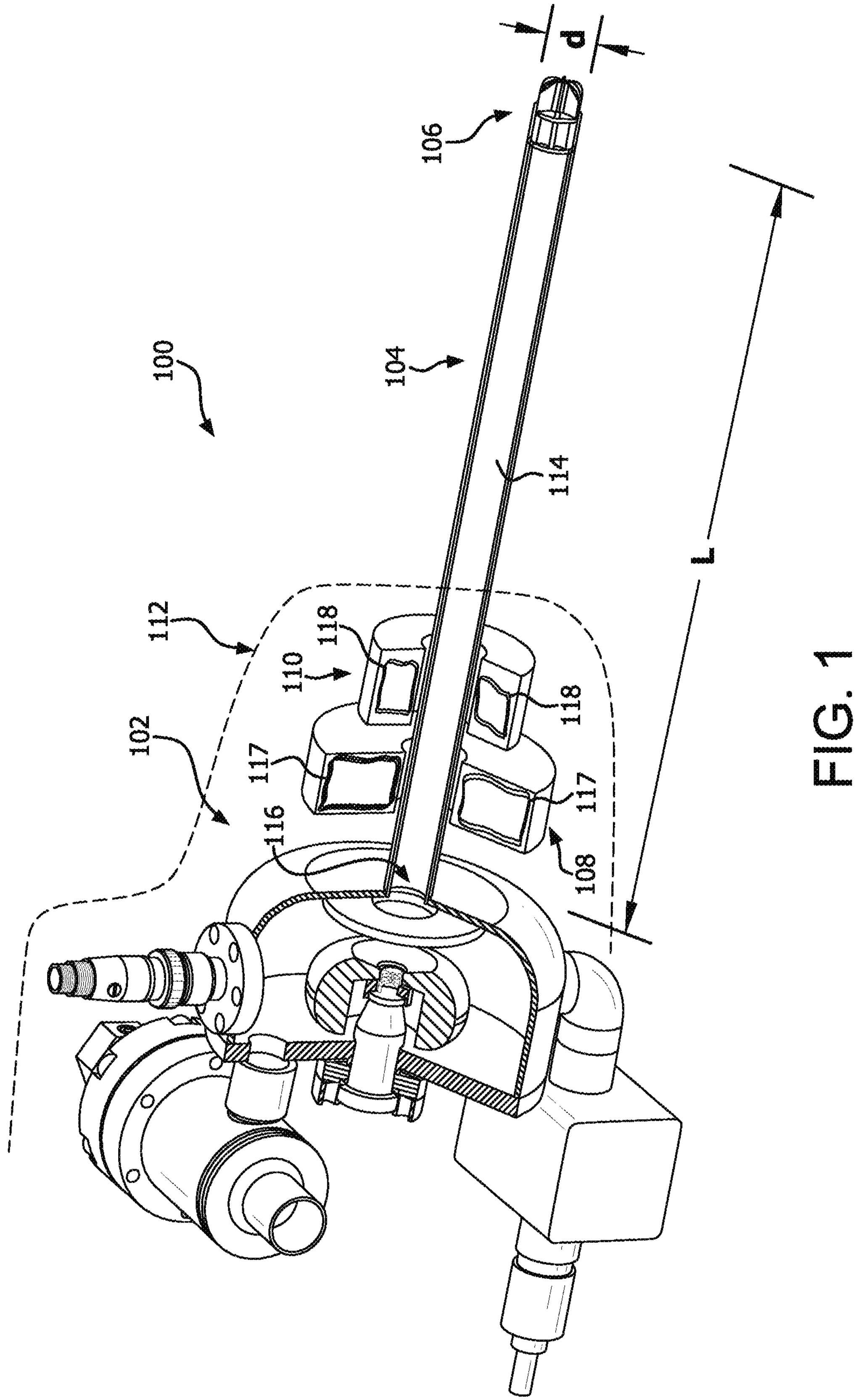
FIG. 1 is a perspective view of an X-ray source with some structures shown partially cut-away to facilitate improved understanding.

It will be readily understood that the solution described herein and illustrated in the appended figures could be arranged and designed in a wide variety of different configurations. Thus, the following more detailed description, as represented in the figures, is not intended to limit the scope of the present disclosure, but is merely representative of certain implementations in various different scenarios. While the various aspects are presented in drawings, the drawings are not necessarily drawn to scale unless specifically indicated.

A solution disclosed herein concerns an X-ray source which can be used for treating superficial tissue structures in various radiotherapy procedures, including IORT. Drawings useful for understanding the X-ray source 100 are provided in FIGS. 1-7. With the arrangement shown in FIGS. 1-7, X-rays can be selectively directed in a plurality of different directions around a periphery of a beam directionally controlled target assembly (DCTA) 106 comprising the X-ray source. Moreover, the pattern of relative X-ray intensity, which defines the shape of the beam, can be controlled to facilitate different treatment plans. For example, the intensity over a range of angles can be selected to vary an X-ray beam parameter such as beam width.

The source 100 is comprised of electron beam generator (EBG) 102, a drift tube 104, DCTA 106, beam focusing unit 108, and beam steering unit 110. In some scenarios, a cosmetic cover or housing 112 can be used to enclose the EBG 102, beam focusing unit 108 and beam steering unit 110.

The DCTA 106 can facilitate a miniature source of steerable X-ray energy, which is particularly well suited for IORT. Accordingly, the dimensions of the various components can be selected accordingly. For example, the diameter d of the drift tube 104 and DCTA 106 can be advantageously selected to be about 30 mm or less. In some scenarios, the diameter of these components can be 10 mm, or less. For example the diameter of these component can be selected to be in the range of about 10 mm to 25 mm. Of course, the drift tube and DCTA 106 are not limited in this regard and other dimensions are also possible.

Similarly, the drift tube 104 is advantageously configured to have an elongated length L which extends some distance from the EBG 102. The drift tube length is advantageously selected so that it is sufficiently long so as to extend from the cover or housing 112 and into a tumor cavity of a patient so that the DCTA can be selectively positioned inside of a portion of a human body undergoing treatment. Accordingly, exemplary values of drift tube length L can range from 10 cm to 50 cm, with a range of between 18 cm to 30 cm being suitable for most applications. Of course, the dimensions disclosed herein are provided merely as several possible examples and are not intended to be limiting.

Electron beam generators are well-known in the art and therefore the structure and operation of the EBG will not be described in detail. However, a brief description of various aspects of the EBG 102 is provided here to facilitate an understanding of the disclosure. The EBG 102 can include several major components which are best understood with reference to FIGS. 2 and 3. These components can include an envelope 202 which encloses a vacuum chamber 210. In some scenarios, the envelope 202 can be comprised of a glass, ceramic or metallic material that provides suitable freedom from air leaks. Within the vacuum chamber a vacuum is established and maintained by means of an evacuation port 216 and a getter 214.

Figure 2:
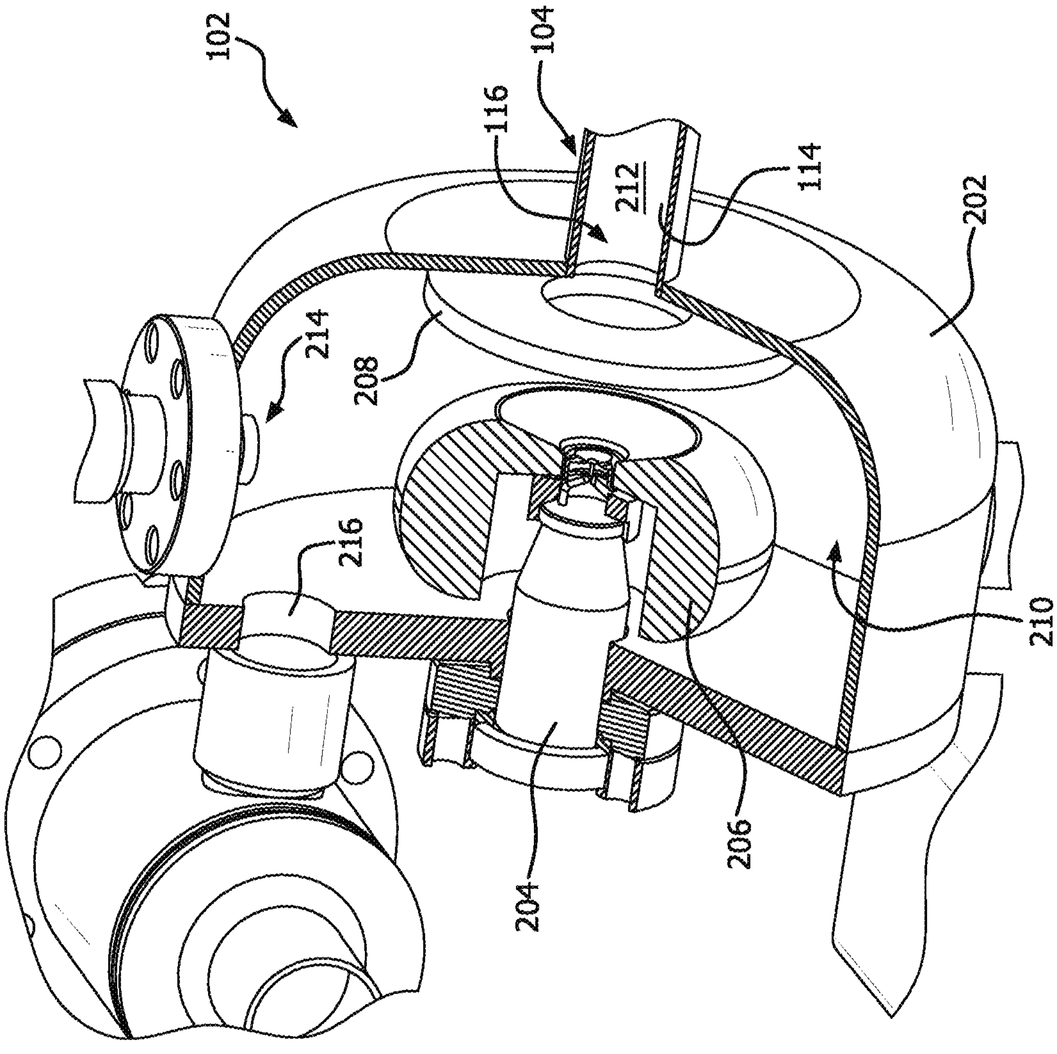
FIG. 2 is an enlarged view of a portion of FIG. 1 which shows certain details of an electron beam generator.

Inserted within the vacuum chamber is a high voltage connector 204 for providing high negative voltage to a cathode 306. A suitable high voltage applied to the cathode for purposes of X-ray generation as described herein would be in the range of −50 kV and −250 kV. Also enclosed in the vacuum chamber is a field shaper 206 and a repeller 208. The purpose of each of these components is well known in the electron beam generator art. However, a brief description is provided to facilitate understanding of the solution presented herein. The cathode 306, when heated, serves as a source of electrons, which are accelerated by the high voltage potential between the cathode 306 and the anode. In FIG. 2, the purpose of the anode is served by the envelope 202, and the repeller 208, where the envelope 202 is at ground voltage and the repeller is at a small positive voltage with respect to ground.

Figure 3:
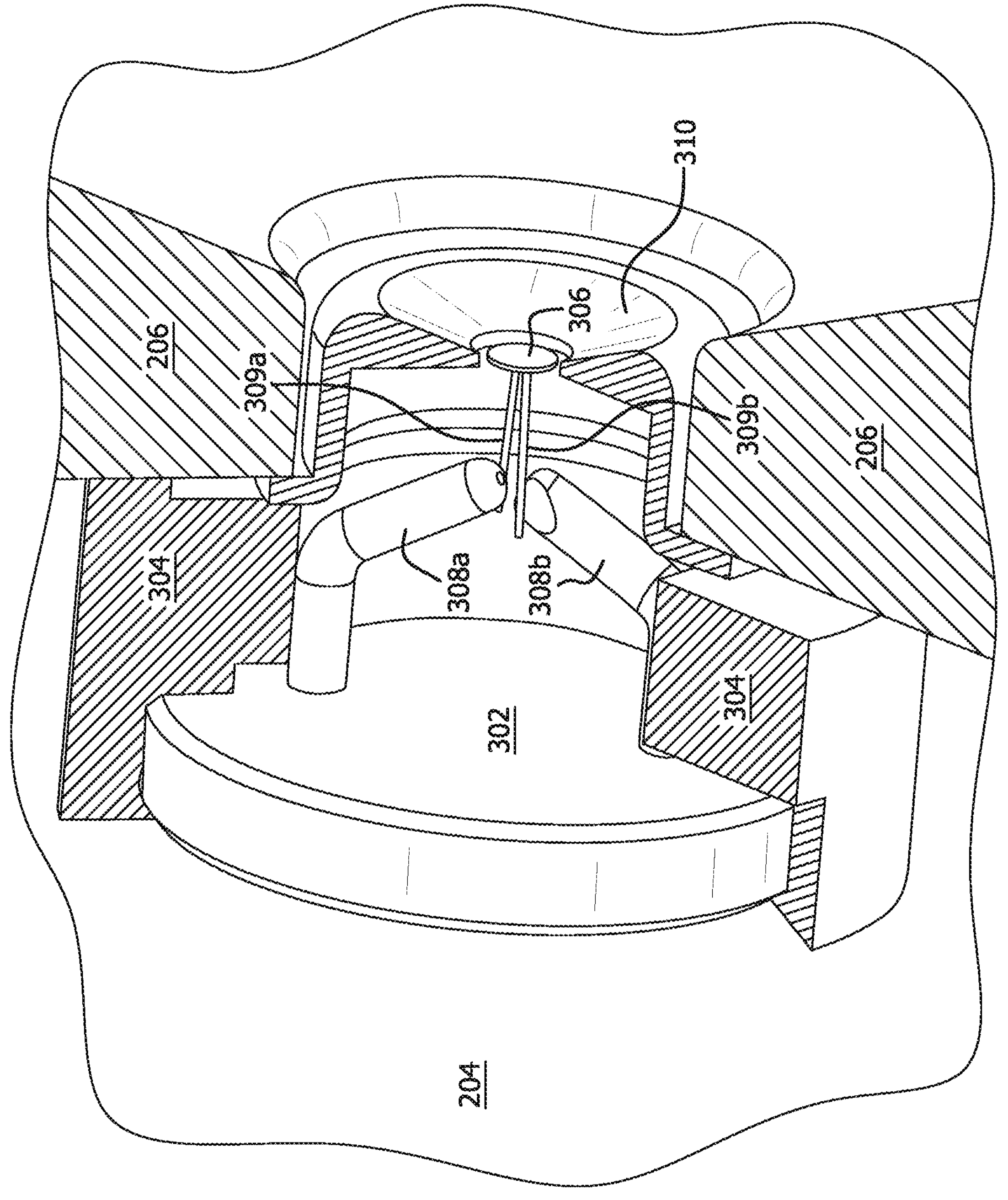
FIG. 3 is an enlarged view of a portion of FIG. 2 which shows certain details of an electron beam generator.

The function of the repeller 208 is to repel any positively charged ions that might be generated in the drift tube 104 or the DCTA 106, thus preventing those ions from entering the region of the cathode 306 where they might cause damage. The function of the field shaper 206 is to provide smooth surfaces which control the shape and magnitude of the electric field caused by the high voltage. In the scenario of FIG. 3, the grid 310 provides a desired shape to the electric field in the vicinity of the cathode 306, as well as allowing the emission of electrons from the cathode 306 to be shut off. The cathode 306 is fixed to the legs of the heater 309*a* and 309*b*. The legs of the heater 309*a* and 309*b* are typically made from a metallic material that has both high electrical resistivity and high resistance to thermal degradation, thus allowing an electric current flowing through the heater legs to generate a high temperature that heats the cathode 306. The electrical connections to the heater legs 309*a* and 309*b* are provided by the connector pins 308*a* and 308*b*, which connect the heater legs 309*a* and 309*b* to connections in the high voltage connector 204. The insulating disk 302 is typically made of an insulating material such as glass or ceramic and provides electrical insulation between the connector pins 308*a* and 308*b* and is also resistant to heat generated by the heater legs 309*a* and 309*b*.

In a scenario disclosed herein, the drift tube 104 can be comprised of a material such as stainless steel. In other scenarios the drift tube can be partially comprised of Silicon Carbide (SiC). Alternatively, the drift tube 104 can be comprised of a ceramic material such as alumina or aluminum nitride. If the drift tube structure is not formed of a conductive material, then it can be provided with a conductive inner lining 114. For example, the conductive inner lining can be comprised of copper, titanium alloy or other material, which has been applied (e.g., applied by sputtering, evaporation, or other well-known means) to the interior surface of the drift tube. The hollow inner portion of the drift tube is open to the vacuum chamber 210, such that the interior 212 of the drift tube 104 is also maintained at vacuum pressure. A suitable vacuum pressure for purposes of the solution described herein can be in the range below about $10^{-5}$ torr or particularly between about $10^{-9}$ torr to $10^{-7}$ torr.

Electrons comprising an electron beam are accelerated by EBG 102 toward the DCTA 106. These electrons will have significant momentum when they arrive at the entry aperture 116 to the drift tube 104. The interior 212 of the drift tube is maintained at a vacuum and at least the inner lining 114 of the tube is maintained at ground potential. Accordingly, the momentum imparted to the electrons by EBG 102 will continue to ballistically carry the electrons down the length of the drift tube 104 at very high velocity (e.g., a velocity approaching the speed of light) toward the DCTA 106. It will be appreciated that as the electrons are traveling along the length of the drift tube 104, they are no longer electrostatically accelerated.

The beam focusing unit 108 is provided to focus a beam vortex of electrons traveling along the length of the drift tube. For example, such focusing operations can involve adjusting the beam to control a point of convergence of the electrons at the DCTA tip. As such, the beam focusing unit 108 can be comprised of a plurality of magnetic focusing coils 117, which are controlled by selectively varying applied electric currents therein. The applied electric currents cause each of the plurality of magnetic focusing coils 117 to generate a magnetic field. Said magnetic fields penetrate into the drift tube 104 substantially in the region enclosed by the beam focusing unit 108. The presence of the penetrating magnetic fields causes the electron beam to converge selectively in a manner well understood in the art.

A beam steering unit 110 is comprised of a plurality of selectively controllable magnetic steering coils 118. The steering coils 110 are arranged to selectively vary a direction of travel of electrons traveling within the drift tube 104. The magnetic steering coils achieve this result by generating (when energized with an electric current) a magnetic field. The magnetic field exerts a force selectively upon the electrons traveling within the drift tube 104, thus varying the electron beam direction of travel. As a result of such deflection of the electron beam direction of travel, a location where the beam strikes a target element of the DCTA 106 can be selectively controlled.

Figure 4:
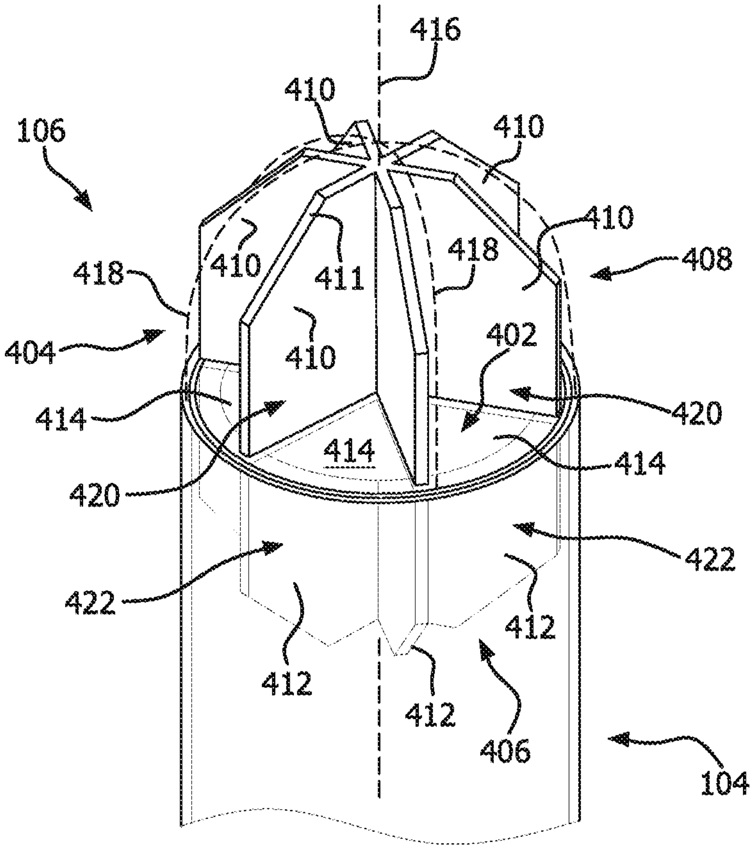
FIG. 4 is an enlarged perspective view of an X-ray emission directionally controlled target assembly (DCTA) which is useful for understanding the X-ray source of FIG. 1.
Figure 5:
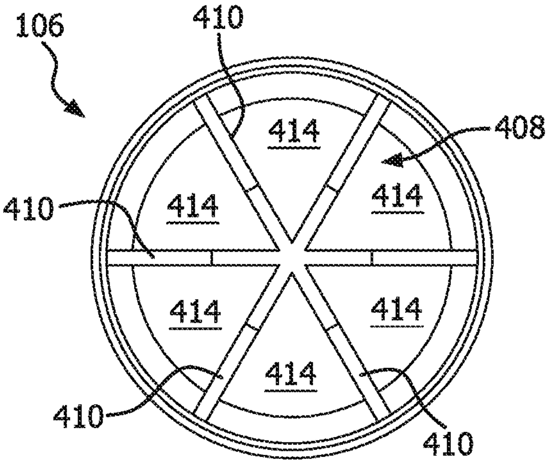
FIG. 5 is an end view of the DCTA in FIG. 4.

As shown in FIGS. 4 and 5, the DCTA 106 is disposed at an end portion of the drift tube 104, distal from the EBG 102. The DCTA is comprised of a target 402 and a beam shield 404. The target 402 is comprised of a disk-shaped element, which is disposed transverse to the direction of electron beam travel. For example, the disk-shaped element can be disposed in a plane which is approximately orthogonal to the direction of electron beam travel. In some scenarios, the target 402 can enclose an end portion of the drift tube 104 distal from the EBG to facilitate maintenance of the vacuum pressure within the drift tube. The target 402 can be comprised of various different materials; however it is advantageously comprised of a material such as molybdenum, gold, or tungsten which has a high atomic number so as to facilitate the production of X-rays at relatively high efficiency when bombarded with electrons. The structure of the target 402 will be described in greater detail as the discussion progresses.

As shown in FIG. 4, the beam shield 404 can include a first portion 406 which is disposed adjacent to one major surface of the target 402, and a second portion 408, which is disposed adjacent to an opposing major surface of the target. In some scenarios, the first portion 406 can be disposed internal of the drift tube 104 within a vacuum environment, and the second portion 408 can be disposed external of the drift tube. If a portion of the beam shield 404 is disposed external of the drift tube as shown in FIG. 4, then an X-ray-transmissive cap member 418 can be disposed over the second portion 408 of the beam shield to enclose and protect the portions of the DCTA external of the drift tube. In FIG. 4, the cap member is indicated by dotted lines only so as to facilitate an understanding of the DCTA structure. However, it should be understood that the cap member 418 would extend from the end of the drift tube 104 so as to enclose the first portion 406 of the DCTA.

The beam shield 404 is comprised of a plurality of wall elements 410, 412. The wall elements 410 associated with the first portion 406 can extend from a first major surface of the disk-shaped target which faces in a direction away from the EBG 102. The wall shaped elements 412 associated with the second portion 408 can extend from the opposing major surface of the target facing toward the EBG 102. The wall elements 410, 412 also extend in a radial direction outwardly from a DCTA centerline 416 toward a periphery of the disk-shaped target 402. Accordingly, the wall elements form a plurality of shielded compartments 420, 422. The wall elements 410, 412 can be advantageously comprised of a material which interacts in a substantial way with X-ray photons. In some scenarios, the material can be one that interacts with the X-ray photons in a way which causes the X-ray photons to give up a substantial part of its energy and momentum. Accordingly, one type of suitably interactive material for this purpose can comprise a material that attenuates or absorbs X-ray energy. In some scenarios, the material chosen for this purpose can be advantageously chosen to be one that is highly absorbent of X-ray energy.

Suitable materials which are highly absorptive of X-ray radiation are well known. For example, these materials can include certain metals such as stainless steel, molybdenum (Mo), tungsten (W), tantalum (Ta), or other high atomic number (high-Z) materials. As used herein the phrase high-Z material will generally include those which have an atomic number of at least 21. Of course, there may be some scenarios in which a lesser degree of X-ray absorption is desired. In such scenarios, a different material may be suitable. Accordingly, a suitable material for the shield wall is not necessarily limited to high atomic number materials.

In the scenario shown in FIG. 4, the plurality of wall elements extend radially outward from the centerline 416. However, the configuration of the beam shield is not limited in this regard and it should be understood that other beam shield configurations are also possible. Several of such alternative configurations are described below in further detail. Each of the wall elements can further comprise rounded or chamfered corners 411 to facilitate beam formation as described below. These rounded or chamfered corners can be disposed at portions of the wall elements, which are distal from the target 402 and spaced apart from the centerline 416.

As shown in FIG. 4, wall elements 410 can be aligned with wall elements 412 to form aligned pairs of shielded compartments 420, 422 on opposing sides of the target 402. Each such shielded compartment will be associated with a corresponding target segment 414 which is bounded by a pair of wall elements 410 on one side of the target 402, and a pair of wall elements 412 on an opposing side of the target.

Figure 6:
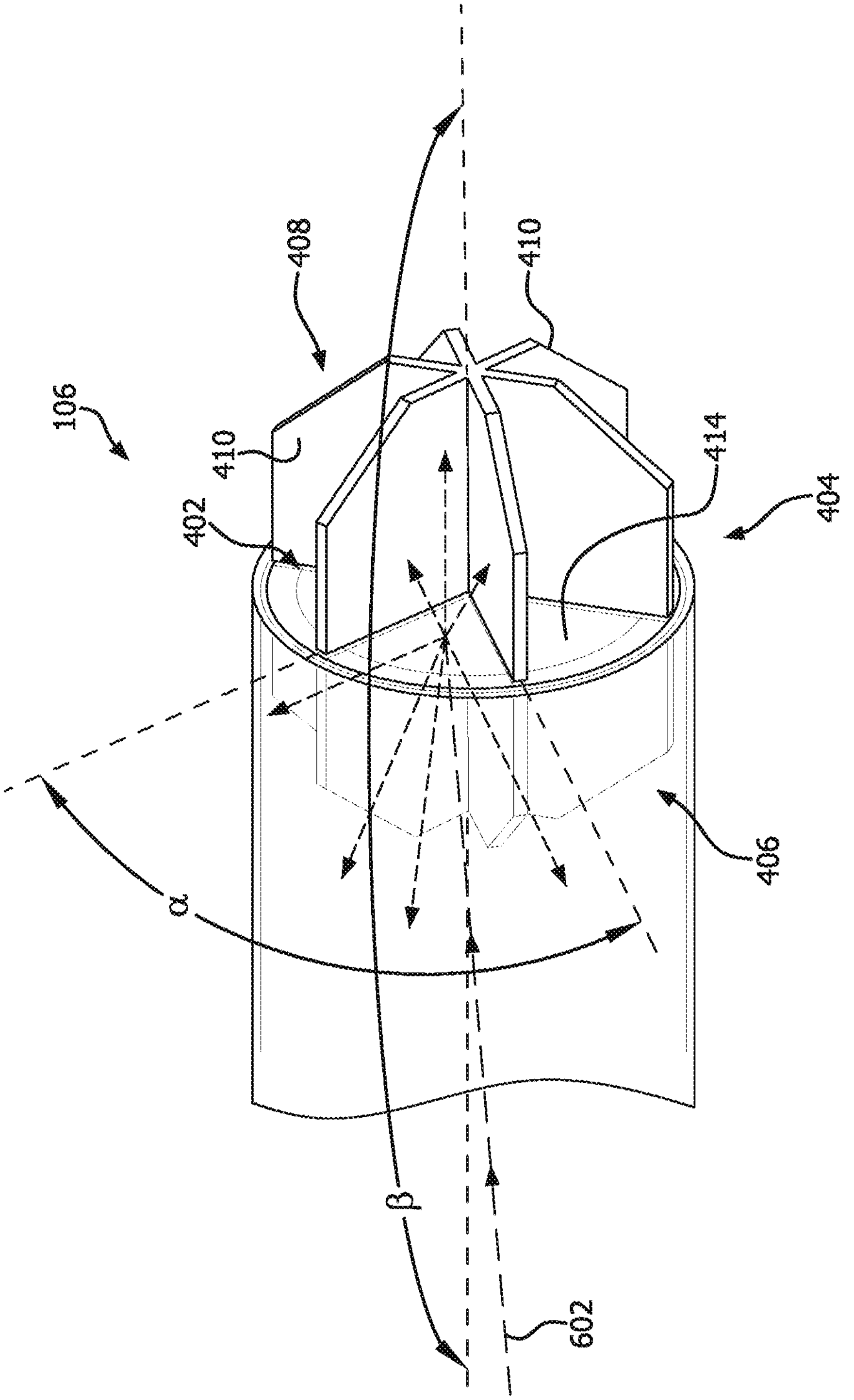
FIG. 6 is an enlarged view of the DCTA in FIG. 6 which is useful for understanding an X-ray beam-forming operation.

As is known, X-ray photons are released in directions which are generally transverse to the collision path of the electron beam with the major surface of the target 402. The target material is comprised of a relatively thin layer of target material such that electrons bombarding the target 402 produce X-rays in directions extending away from both major surfaces of the target. Each aligned pair of shielded compartments 420, 422 (as defined by wall elements 410, 412) and their corresponding target segment 414 comprise a beam-former. X-rays which are generated when high energy electrons interact with a particular target segment 414 will be limited in their direction of travel by the wall elements defining the compartments 410, 412. This concept is illustrated in FIG. 6, which shows that an electron beam 602 bombards a segment of target 402 to produce transmitted and reflected X-rays in directions that are generally transverse to the collision path of the electron beam. But it can be observed in FIG. 6 that the X-rays will only be transmitted over a limited range of azimuth and elevation angles $\alpha$, $\beta$ due to the shielding effect of the beam-former. By selectively controlling which target segment 414 is bombarded with electrons, and where within the target segment 414 that the electron beam actually strikes the target segment, the X-ray beams in a range of different directions and shapes can be selectively formed and sculpted as needed.

Figure 7:
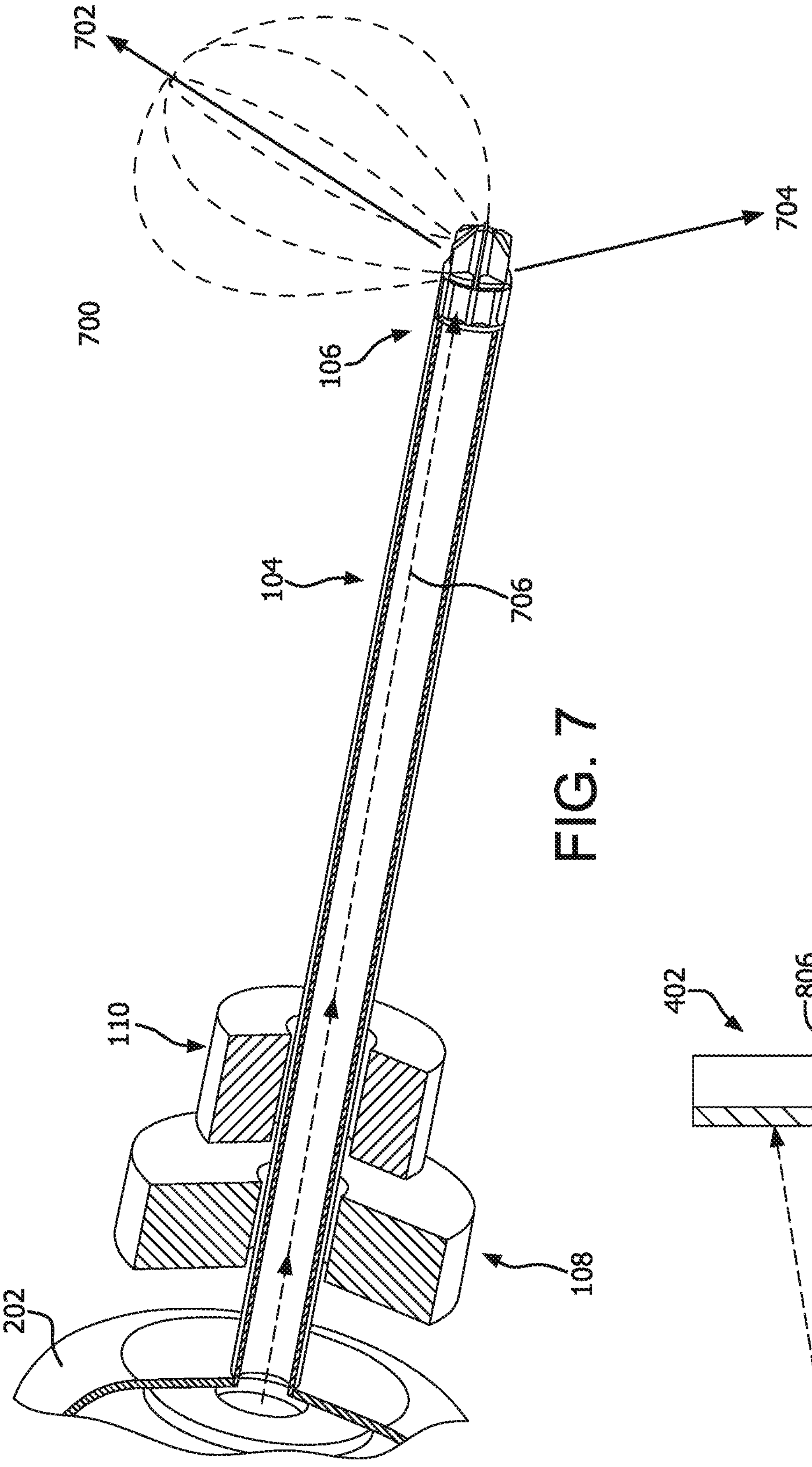
FIG. 7 is a drawing that is useful for understanding an X-ray beam-forming operation in the X-ray source of FIG. 1.

Accordingly, the X-ray beam direction (which is defined by a main axis of transmitted X-ray energy), and a pattern of relative X-ray intensity, which comprises the shape of the beam, can be selectively varied or controlled to facilitate different treatment plans. FIG. 7 illustrates this concept by showing that a direction of maximum intensity of X-ray beam 700 can be aligned in a plurality of different directions 702, 704 by selectively controlling the electron beam 706. The exact three-dimensional shape or relative intensity pattern of the X-ray beam 700 will vary in accordance with several factors described herein. In some scenarios, the electron beam can be rapidly steered so that different target segments are successively bombarded with electrons so that the electron beam intersects different target segments for predetermined dwell times. If more than one target segment 414 is bombarded by the electron beam, then multiple beam segments can be formed in selected directions defined by the associated beam-formers and each can have a different beam shape or pattern.

Figure 8:
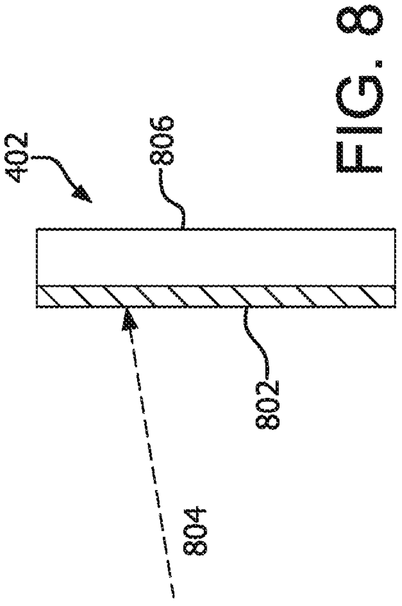
FIG. 8 is a cross-sectional view showing certain details of an X-ray target disclosed herein.

Referring now to FIG. 8 it can be observed that the target 402 is formed of a very thin layer of target material 802, which can be bombarded by an electron beam 804 as described herein. The target material is advantageously chosen to be one which has a relatively high atomic number. Exemplary target materials which can be used for this purpose include molybdenum, tungsten and gold. The thin layer of target material 802 is advantageously disposed on a thicker substrate layer 806. The substrate layer is provided to facilitate a target that is more robust for added strength, and to facilitate thermal energy transfer away from the metal layer. Exemplary materials that could be used for the substrate layer 806 can include Beryllium, Aluminum, Sapphire, Diamond or ceramic materials such as alumina or boron-nitride. Among these, Diamond is particularly advantageous for this application as it is relatively transmissive of X-rays, non-toxic, strong, and offers excellent thermal conductivity.

A diamond substrate disk, which is suitable for substrate layer 804 can be formed by a chemical vapor deposition technique (CVD) that allows the synthesis of diamond in the shape of extended disks or wafers. In some scenarios, these disks can have a thickness of between 300 to 500 μm. Other thicknesses are also possible, provided that the substrate has sufficient strength to contain the vacuum within the drift tube 104 and is not so thick as to attenuate X-rays passing through it. In some scenarios a CVD diamond disk having a thickness of about 300 μm can be used for this purpose. A thin layer of a target material 802, which has been sputtered on one side of the CVD diamond disks as described herein can have thickness of between 2 to 50 μm. For example, the target material can in some scenarios have a thickness of 10 μm. Of course, other thicknesses are also possible and the solution presented herein is not intended to be limited by these values.

Figure 9:
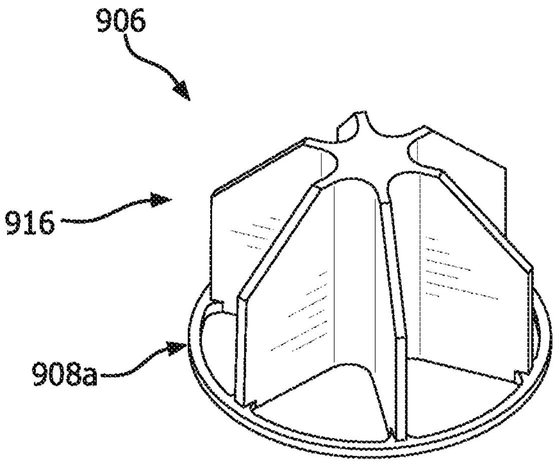
FIGS. 9, 10 and 11 are a series of drawings which are useful for understanding a first alternative X-ray DCTA configuration.
Figure 10:
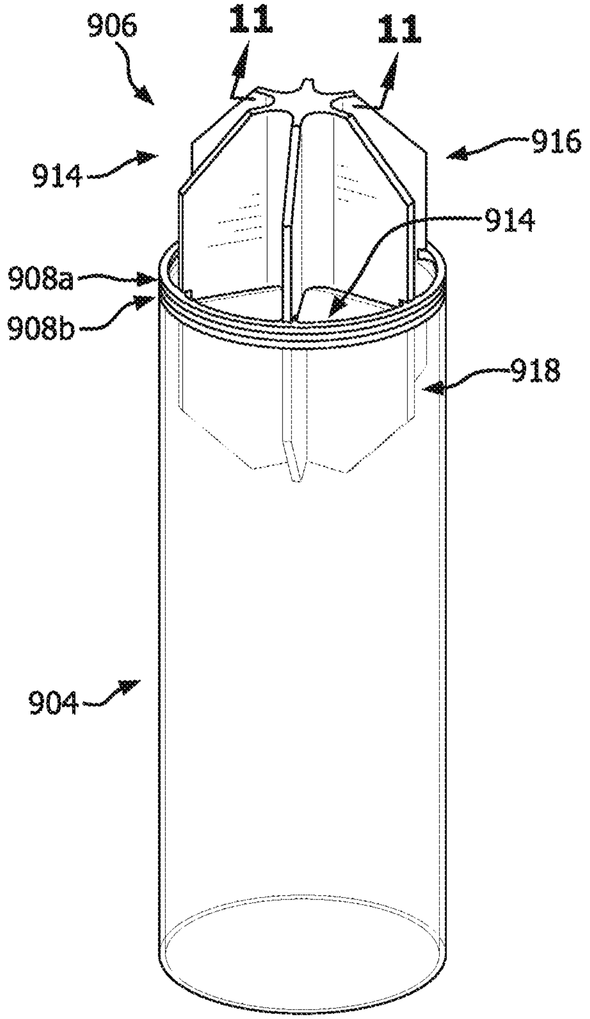
Figure 11:
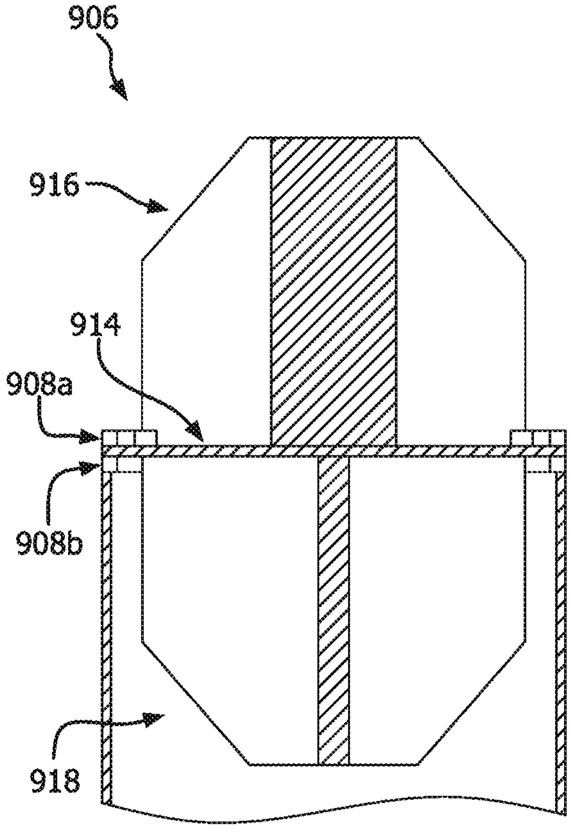

FIGS. 9, 10 and 11 are a series of drawings which are useful for understanding a first alternative DCTA configuration. The DCTA 906 is similar to the DCTA 106 but includes an additional ring element mounted to a periphery of the beam shield 914 to facilitate attachment of the DCTA to an end portion of the drift tube 904. More particularly, each of a first and second portion 916, 918 of the beam shield 914 can respectively include a ring 908*a*, 908*b*. The target 914 can be disposed between the two rings. One or both of the rings can then be secured to the end of the drift tube (e.g., secured by brazing) as shown in FIG. 11.

Figure 12:
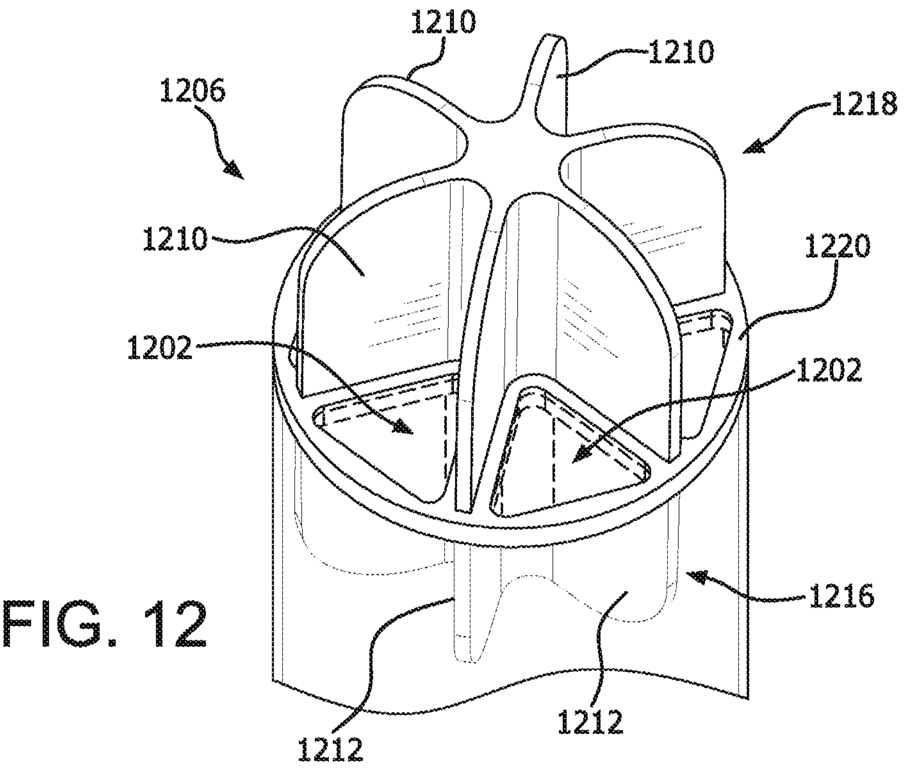
FIG. 12 is a second alternative DCTA configuration.
Figure 13:
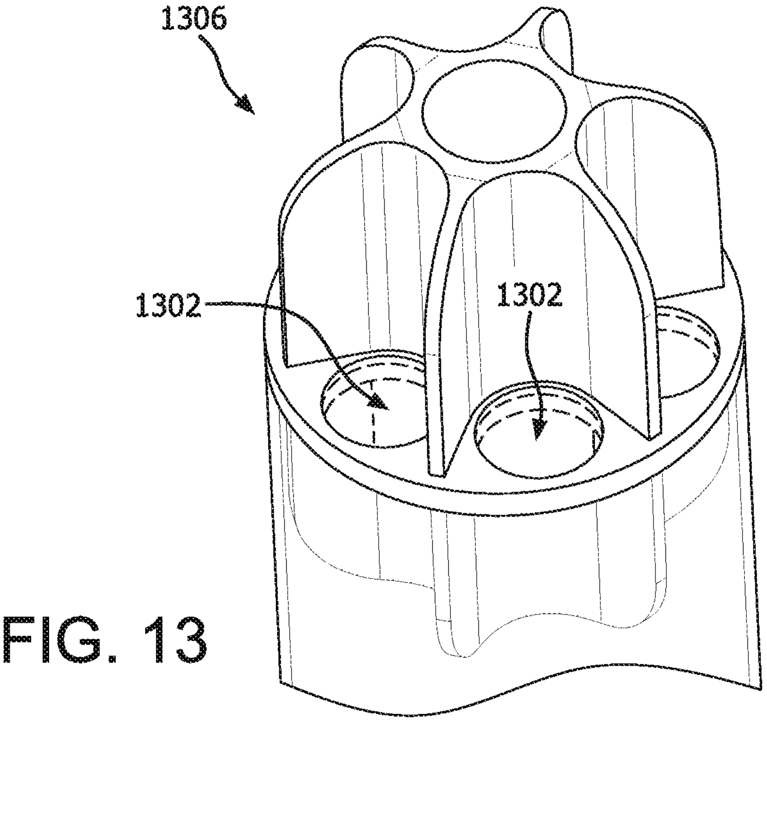
FIG. 13 is a third alternative DCTA configuration.

FIG. 12 is useful for understanding a second alternative DCTA configuration. In this scenario, the single disk-shaped X-ray target 402 shown in FIG. 4 is replaced by a plurality of individual smaller wedge-shaped targets 1202, which are respectively aligned with each of the compartments as shown. In such a scenario, the wall elements 1210, 1212 corresponding to two portions 1216 and 1218 and medial base plate 1220 can be optionally made of a single piece of material. The segmented wedge-shaped targets 1202 can be positioned in the medial base plate 1220 between the wall elements as shown, after which the entire assembly can be fixed to an end portion of the drift tube. It can also be observed in FIG. 12 that wall elements 1210 have curved or rounded corners rather than the chamfered corners shown in FIGS. 4-6. FIG. 13 is a third alternative DCTA 1306 which is similar to the arrangement shown in FIG. 12, but is comprised of a plurality of separate circular or disk shaped targets 1302 which are provided in place of the wedge-shaped targets 1202.

Figure 14:
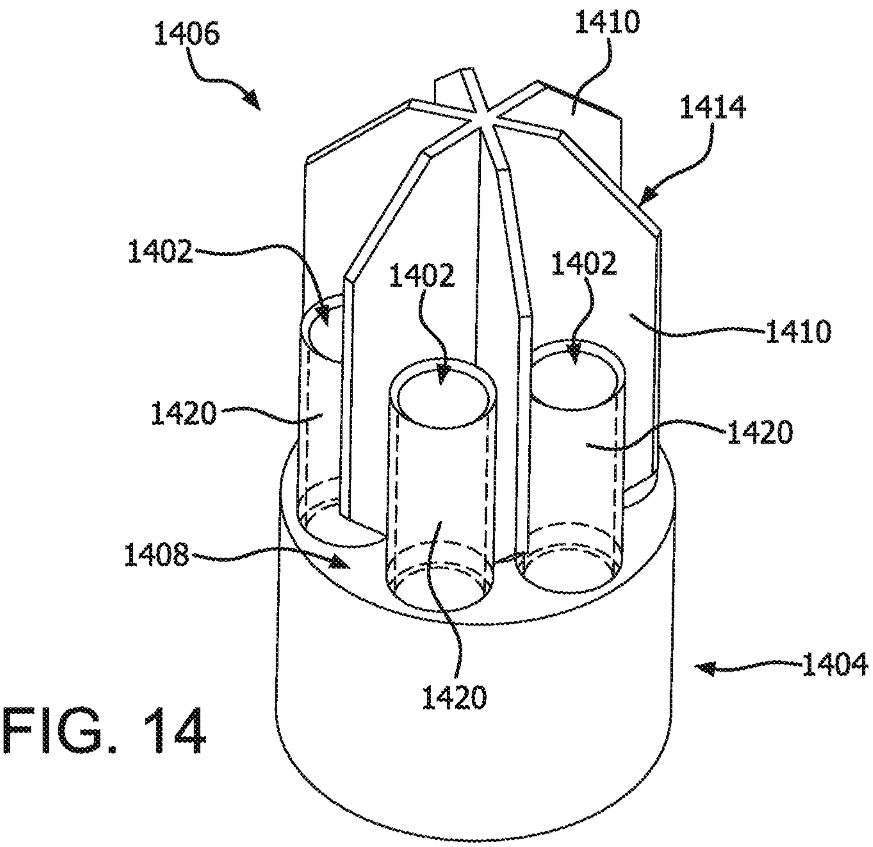
FIG. 14 is a fourth alternative DCTA configuration.
Figure 15:
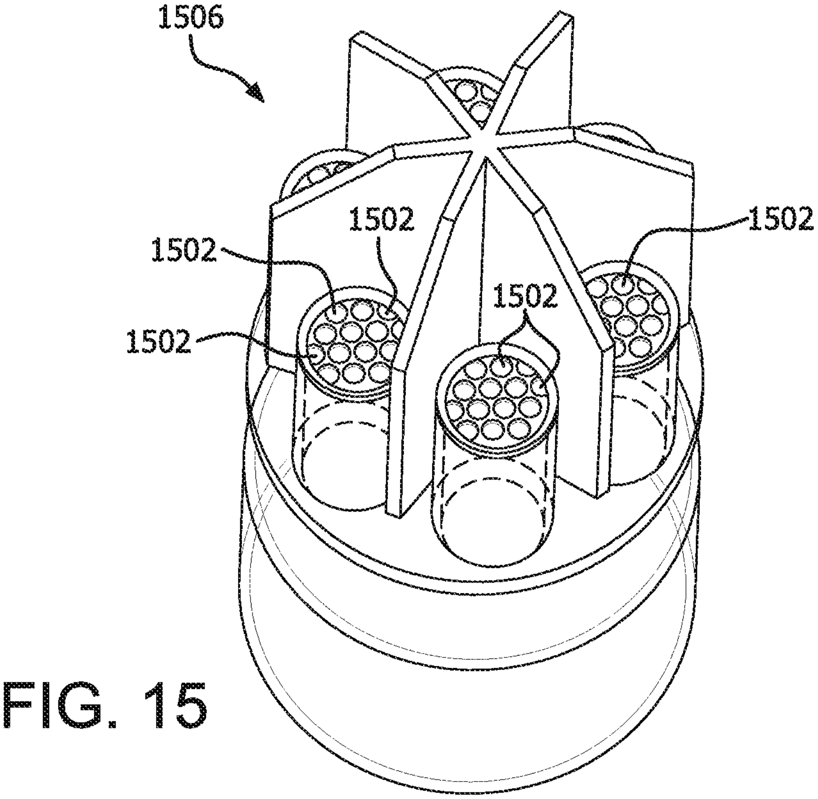
FIG. 15 is a fifth alternative DCTA configuration.

FIG. 14 is a fourth alternative DCTA configuration 1406 in which an entire beam shield 1414 is disposed externally of the drift tube. The target elements 1402 in this scenario are end faces of hollow tubular pedestals 1420. The wall elements 1410 extend from a face of a base plate 1408 which mounts to the drift tube at an end distal from the EBG 102. The end faces defined by the target elements 1402 are spaced apart from the base plate on which the wall elements 1410 are disposed. In some scenarios, the tubular pedestals can have a cylindrical geometry as shown. However, other tubular configurations are also possible. The tubular pedestals can advantageously have a length that is sufficient to position the target elements 1402 at a medial location along the length of the DCTA. As such, the positioning of the target elements can be selected optimally for beam forming operations. The hollow interior portion of each of the pedestals is open to the vacuum defined by the interior of the drift tube 1404. Consequently, an electron beam directed at a particular one of the target elements 1402 will travel in a vacuum environment through the drift tube and through the interior of the pedestal 1420 before striking the target element 1402. FIG. 15 is a fifth alternative DCTA 1506 which is similar to the arrangement shown in FIG. 14. However, in DCTA 1506 each individual target element 1402 shown in FIG. 14 is replaced with a plurality of smaller diameter target elements 1502.

Figure 16A:
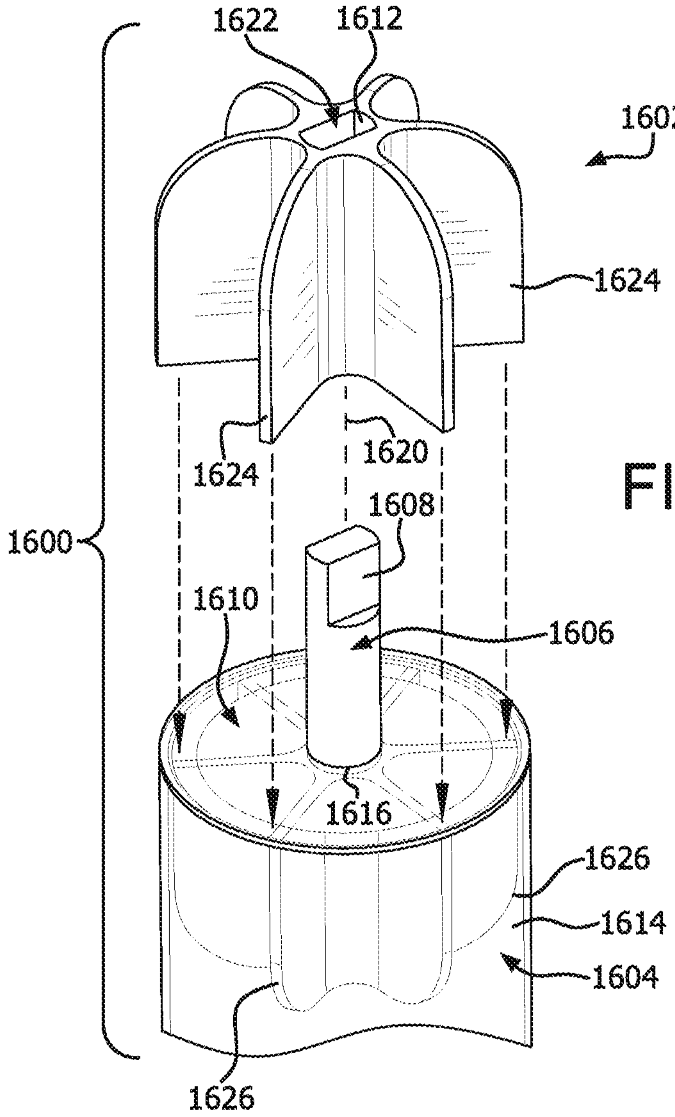
FIGS. 16A-16B are a series of drawings which are useful for understanding a sixth alternative DCTA configuration and assembly process.
Figure 16B:
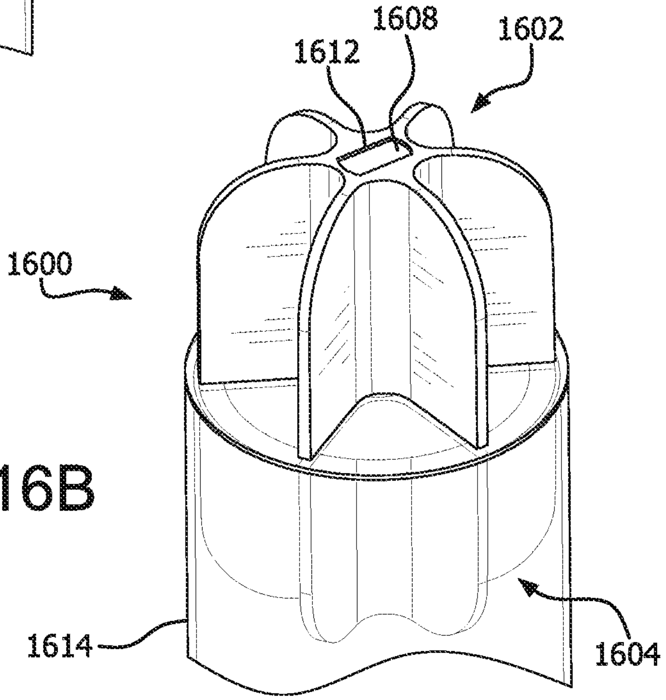

FIGS. 16A and 16B are a series of drawings which are useful for understanding a sixth alternative DCTA configuration and assembly process. As will be appreciated from the discussion herein, proper alignment of first and second portions 1602, 1604 of a beam shield 1600 is important to ensure correct functioning of each X-ray beam-former. This problem is compounded because the second portion 1604 of the beam shield may not be visible to an assembly technician once inserted into the drift tube 1614. Further, it is important that the first and second portions 1602, 1604 remain aligned after assembly.

To facilitate these alignment concerns a post 1606 is provided in alignment with a central axis 1620 of the second portion 1604. The post 1606 can extend through an aperture 1616 in the target 1612. The post can include a notch element or key structure 1608. A bore 1622 is defined within the first portion 1602 in alignment with the central axis 1620. At least a portion of the bore can have a complimentary notch element or key structure 1612. This complimentary notch element or key structure will correspond to the geometry and shape of the notch or keyed structure 1608. Accordingly, the first and second portions 1602, 1604 can only be mated in a manner shown in FIG. 16B, whereby the wall elements 1624 of the first portion 1602 are aligned with the wall elements 1626 of the second portion 1604.

Figure 17A:
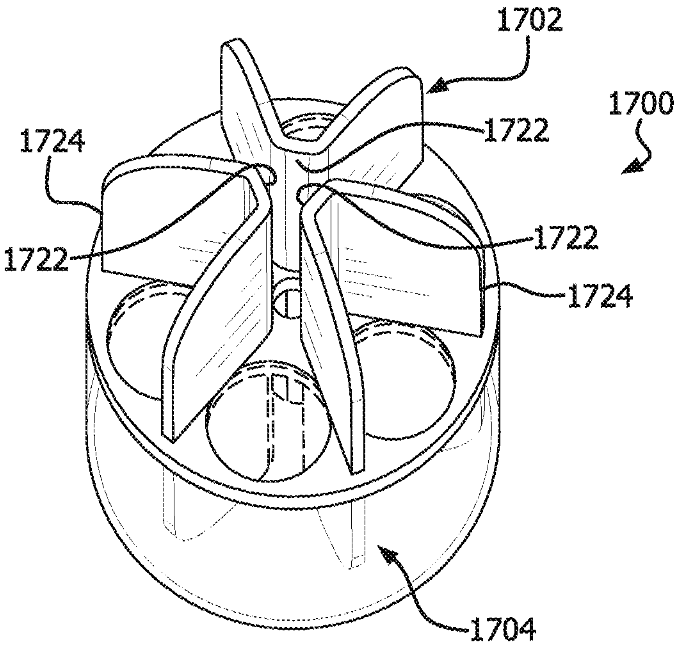
FIGS. 17A and 17B are a series of drawings which are useful for understanding a seventh alternative DCTA configuration and assembly process.
Figure 17B:
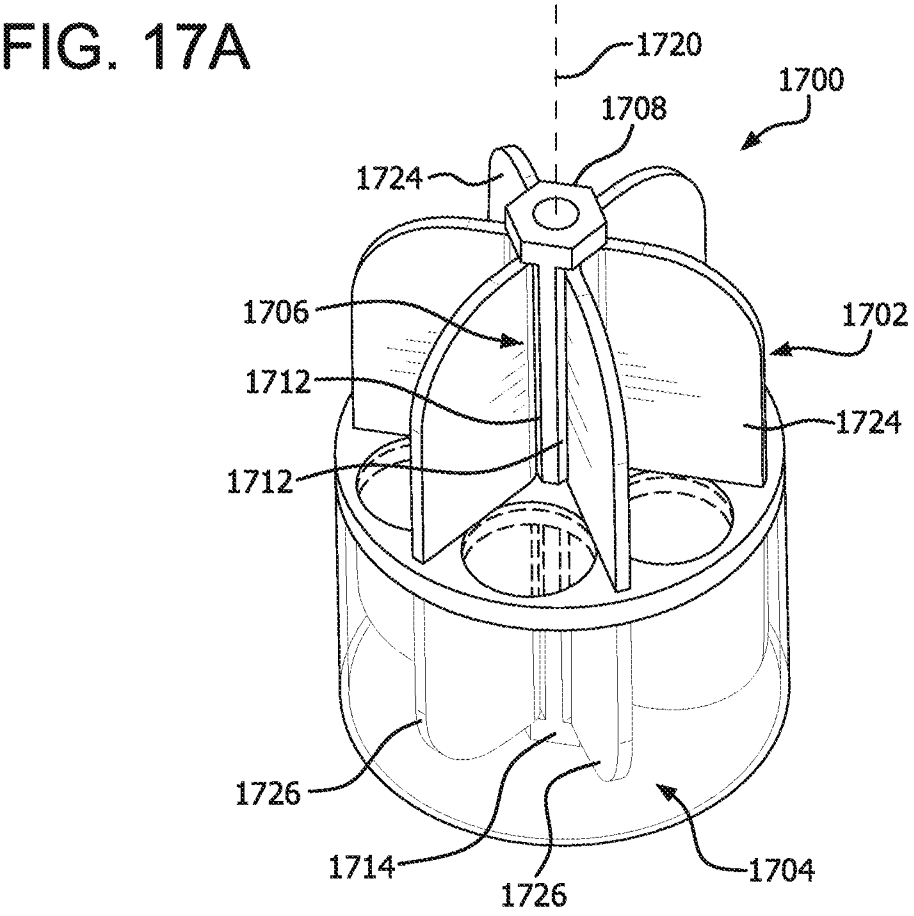

An alignment similar to that described in FIGS. 16A and 16B can alternatively be achieved by means of a profiled pin in a seventh alternative DCTA configuration shown in FIGS. 17A and 17B. As illustrated therein, a beam shield 1700 can comprise first and second portions 1702, 1704. Each of the first and second portions can comprise wall elements 1724, 1726 which define a plurality of guide faces 1722. These guide faces 1722 can engage a plurality of corresponding pin faces 1712 formed on the profiled pin 1706. When the guide faces and pin faces are properly aligned, the profiled pin can be inserted through the first and second portions along a central axis 1720. A pin head 1714 limits the insertion of the pin into the first and second portions. Once inserted, the pin

1706 can be secured in place with a suitable securement device. For example, the pin 1706 can comprise a threaded end on which a threaded nut 1708 can be disposed to hold the pin in place.

Figure 18:
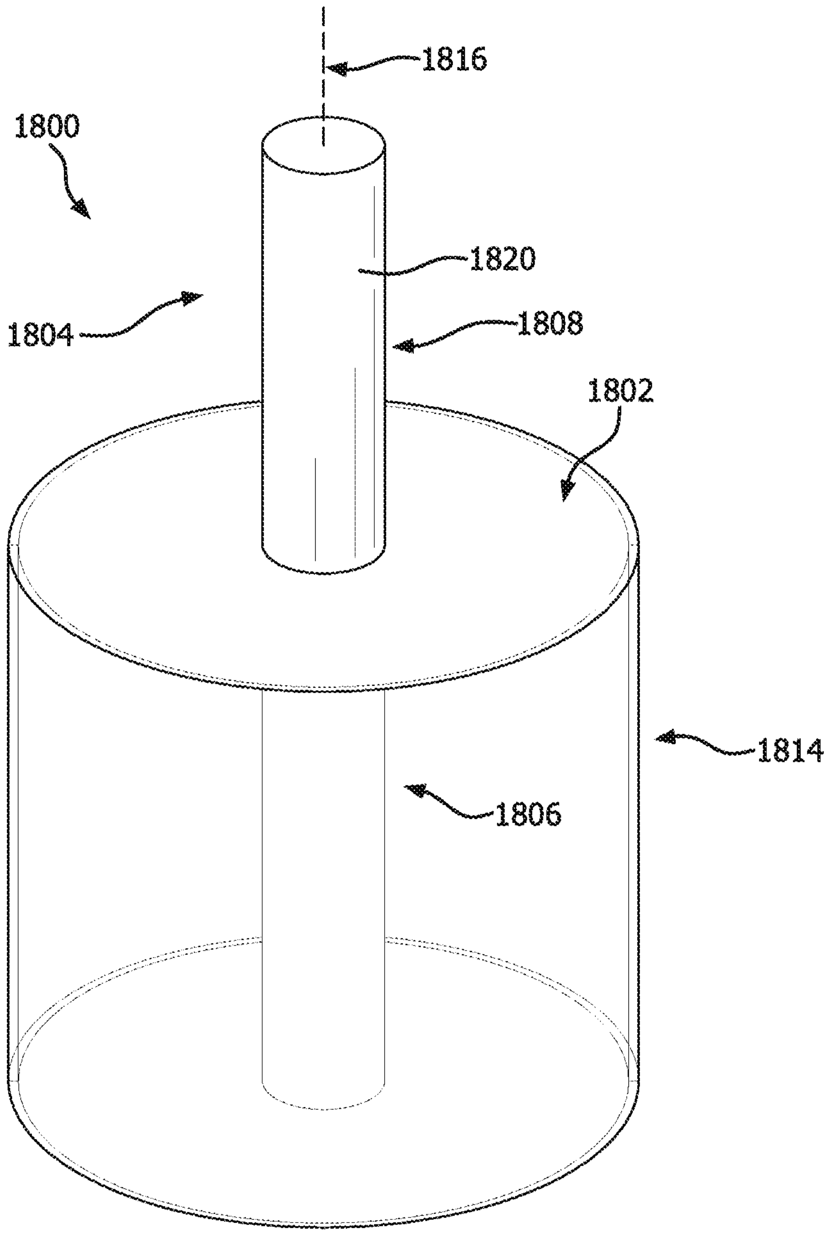
FIG. 18 is a drawing that is useful for understanding an eighth alternative DCTA configuration.

An eighth alternative DCTA 1800 is shown in FIG. 18. The DCTA 1800 is comprised of a target 1802 and a beam shield 1804. The beam shield 1804 has a structure which is comprised of a post 1820. In some scenarios, the post 1820 can be in alignment with a center-line 1816 of the target 1802 and the drift tube 1814. The post can include a first portion 1806 which is disposed adjacent to (and extends from) one major surface of the target 1802, and a second portion 1808 which is disposed adjacent to (and extends from) an opposing major surface of the target. As such, the first portion 1806 can be disposed internal of the drift tube 104 within the vacuum environment, and the second portion 1808 can be disposed external of the drift tube as shown.

The post 1820 can be comprised of a cylindrical post as shown. However, acceptable configurations of the structure are not limited in this regard and the post can also have a different cross-sectional profile to facilitate beam forming operations. For example, the post can have a cross-sectional profile that is square, triangular, or rectangular. In some scenarios the cross-sectional profile can be chosen to be an n-sided polygon (e.g., an n-sided regular polygon). Like the wall elements of the other configurations described herein, the post 1820 is advantageously comprised of a material which greatly attenuates X-ray energy. For example, the post can be comprised of a metal such as stainless steel, molybdenum, or tungsten, tantalum, or other high atomic number (high-Z) materials.

Figure 19:
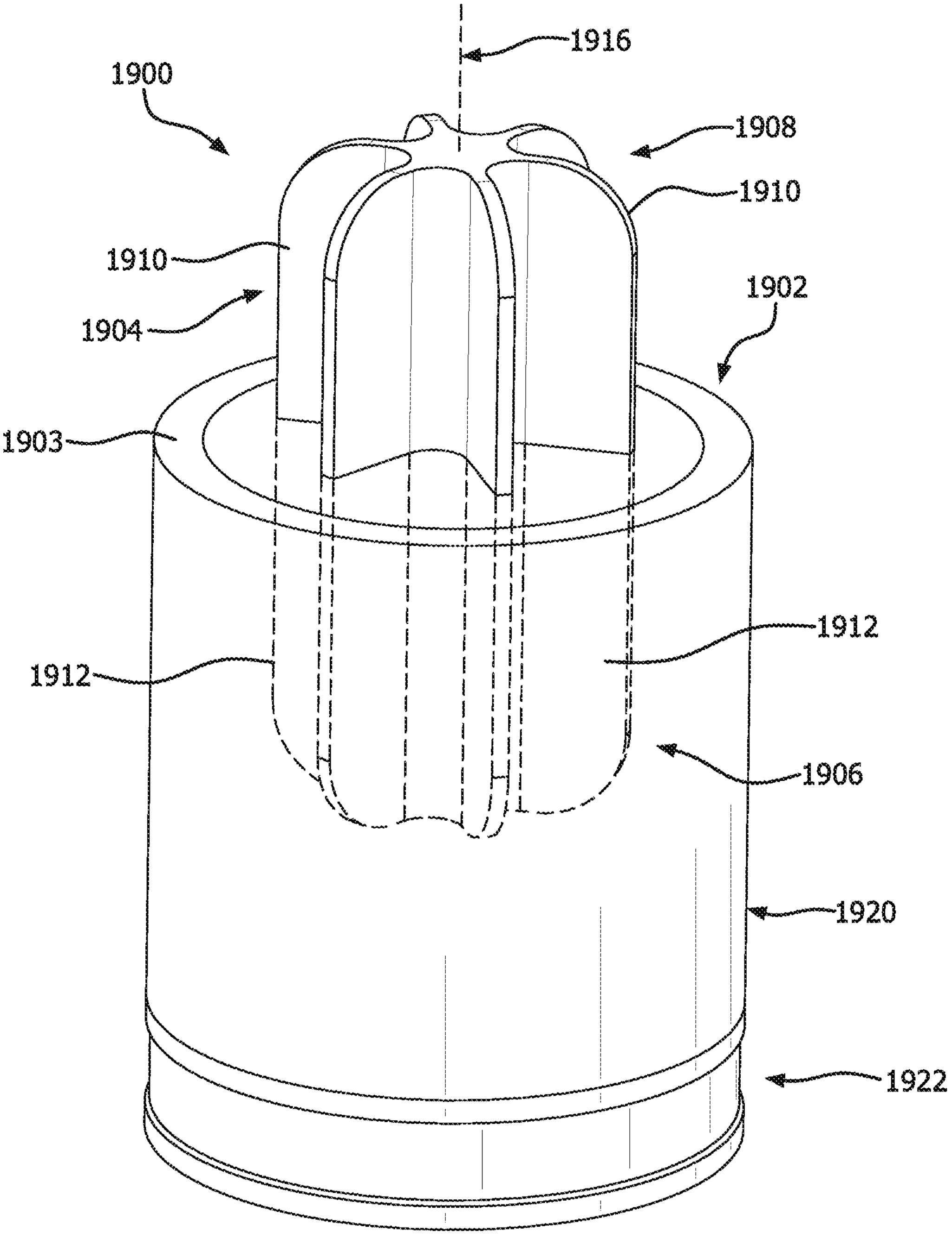
FIG. 19 is a drawing that is useful for understanding an ninth alternative DCTA configuration.

A ninth alternative DCTA 1900 is shown in FIG. 19. The configuration of the DCTA 1900 can be similar to that of DCTA 106. As such the DCTA can include a beam shield 1904 comprised of a first portion 1906 which is disposed adjacent to one major surface of the target 1902, and a second portion 1908 which is disposed adjacent to an opposing major surface of the target. In some scenarios, the first portion 1906 can be disposed within a portion of the DCTA exposed to a vacuum environment associated with the drift tube 104. The second portion 1908 can be disposed external of the drift tube as shown. The beam shield 1904 is comprised of a plurality of wall elements 1910, 1912. The wall elements 1910 associated with the first portion 1906 can extend from a first major surface of the disk-shaped target which faces in a direction away from the EBG 102. The wall shaped elements 1912 associated with the second portion 1908 can extend from the opposing major surface (e.g., a target surface facing toward the EBG 102). The wall elements 1910, 1912 also extend in a radial direction outwardly from a DCTA centerline 1916 toward a periphery of the disk-shaped target 1902. Accordingly, the wall elements form a plurality of shielded compartments.

The DCTA 1900 is similar to many of the other DCTA configurations disclosed herein. However, it can be observed in FIG. 19 that the wall elements 1910, 1912 of DCTA 1900 do not fully extend to the peripheral edge 1903 of the target element 1902. Instead, the wall elements extend only a portion of a radial distance from a DCTA centerline 1916 to the peripheral edge 1903 of target element 1902. The configuration shown in FIG. 19 can be useful to facilitate different beam patterns as compared to other DCTA configurations shown herein.

Figure 20:
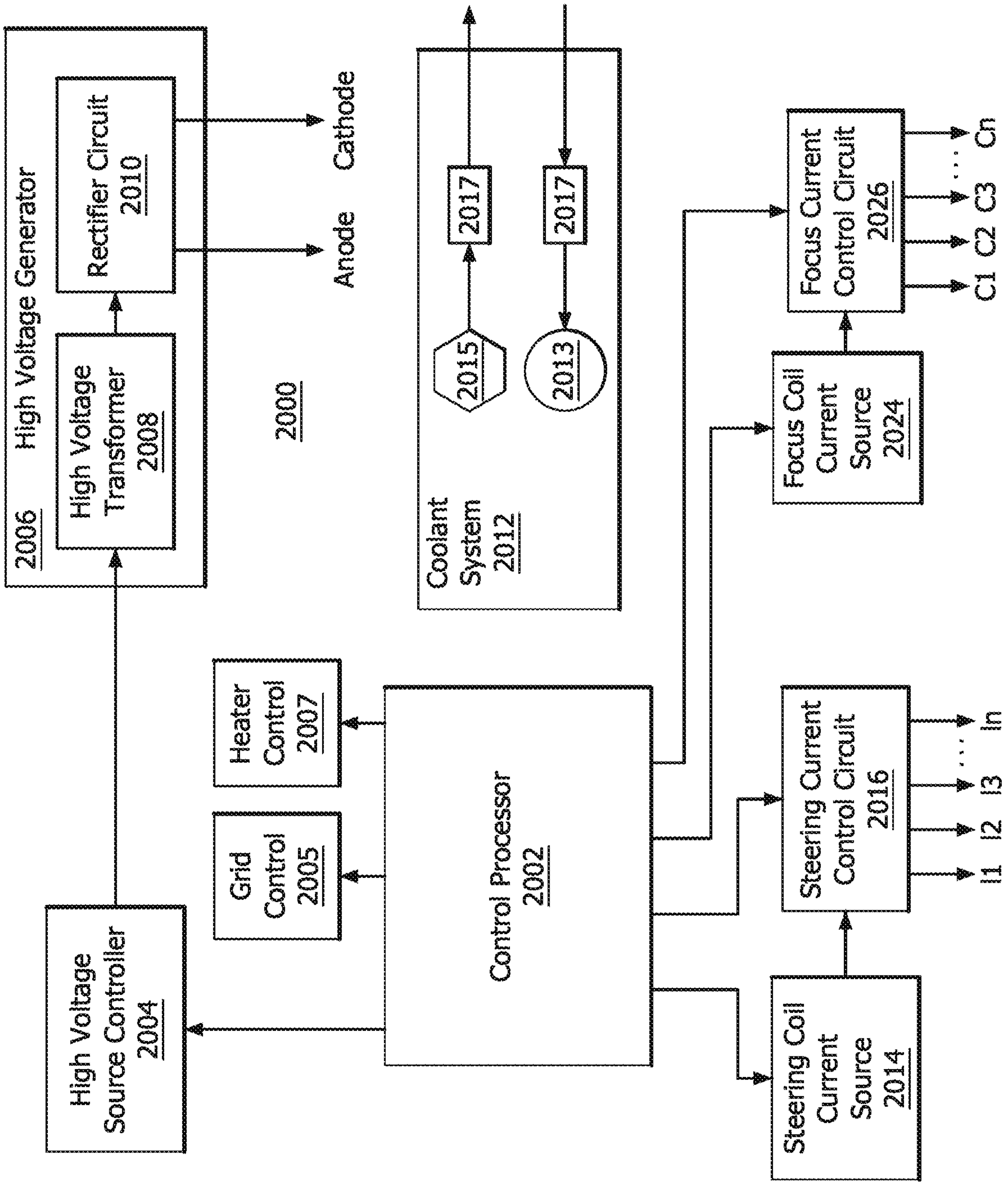
FIG. 20 is a block diagram that is useful for understanding a control system for the X-ray source in FIG. 1.

Turning now to FIG. 20, there is illustrated an exemplary control system 2000 for controlling the X-ray source shown in FIGS. 1-7. The control system can include a control processor 2002, which controls a high voltage source controller 2004, a high voltage generator 2006, a coolant system 2012, a focusing coil current source 2024, a focusing current control circuit 2026, a steering coil current source 2014 and a steering current control circuit 2016. The high voltage source controller 2004 can be comprised of control circuitry which is designed to facilitate control of the high voltage generator 2006. A grid control circuit 2005 and a heater control circuit 2007 can also be provided as part of the exemplary control system.

The high voltage generator 2006 can be comprised of a high voltage transformer 2008 for stepping up relatively low voltage AC to a higher voltage, and a rectifier circuit 2010 for converting the high voltage AC to high voltage DC. The high voltage DC can then be applied to the cathode and the anode in the X-ray source devices described herein.

Coolant system 2012 can include a coolant reservoir 2013 which contains an appropriate fluid for cooling the DCTA 106. For example, water can be used for this purpose in some scenarios. Alternatively, an oil or other type of coolant can be used to facilitate cooling. In some scenarios a coolant can be selected, which minimizes the potential for corrosion of certain metal components comprising the DCTA. A pump 2015, electronically controlled valves 2017, and associated fluid conduits can be provided to facilitate a flow of coolant for cooling the DCTA.

A plurality of electrical connections (not shown) can be provided in association with each of the one or more focusing coils 117 in FIG. 1. These one or more focusing coils can be independently controlled using the control circuitry in FIG. 20. More particularly, the focusing coil current source 2024 can comprise a power supply which is capable of supplying DC electric current to each of the one or more focusing coils 117. This source of electric current can be connected to a focusing coils control circuit 2026 which is comprised of an array of current control elements which are under the control of the control processor. Accordingly, the focusing current control circuit 2026 can selectively direct one or more focusing currents C1, C2, C3, . . . Cn to one or more of the focusing coils 117 for controlling a focus of an electron beam. Methods for focusing an electron beam are known in the art and therefore will not be described here in detail. However, it should be understood that a magnitude of the electric current applied to each of the one or more focusing coils can be selectively controlled to vary the beam focus.

Similarly, a plurality of electrical connections (not shown) can be provided in association with each of the one or more steering coils 118 in FIG. 1. These steering coils can also be independently controlled using the control circuitry in FIG. 20. More particularly, the steering coil current source 2014 can comprise a power supply which is capable of supplying DC electric current to each of the plurality of steering coils. This source of current can be connected to a steering coils control circuit 2016 which is comprised of an array of current control elements which are under the control of the control processor. Accordingly, the steering current control circuit can selectively direct steering currents I1, I2, I3, . . . In to one or more of the steering coils 118 for controlling a direction of an electron beam. Methods for controlling electron beam steering coils are known in the art and therefore will not be described here in detail. For example, electron beam steering is commonly performed in conventional cathode ray tube. Still, it should be understood that a magnitude of the current applied to each of the steering coils can be selectively controlled to vary a position where the electron beam strikes a target.

It should be understood that the arrangements are not limited to magnetic deflection of the electron beam as described herein. Other methods of electron beam steering are also possible. For example, it is well known that applied electric fields can also be used to deflect the electron beam. In such scenarios, high voltage deflection plates could be used to control the electron beam in place of the steering coils and the voltage applied to the plates would be varied rather than the current.

The control processor 2002 can be comprised of one or more devices, such as a computer processor, an application specific circuit, a field programmable gate array (FPGA) logic device, or other circuits programmed to perform the functions described herein. As such, the controller may be a digital controller, an analog controller or circuit, an integrated circuit (IC), a microcontroller, or a controller formed from discrete components.

Figure 21A:
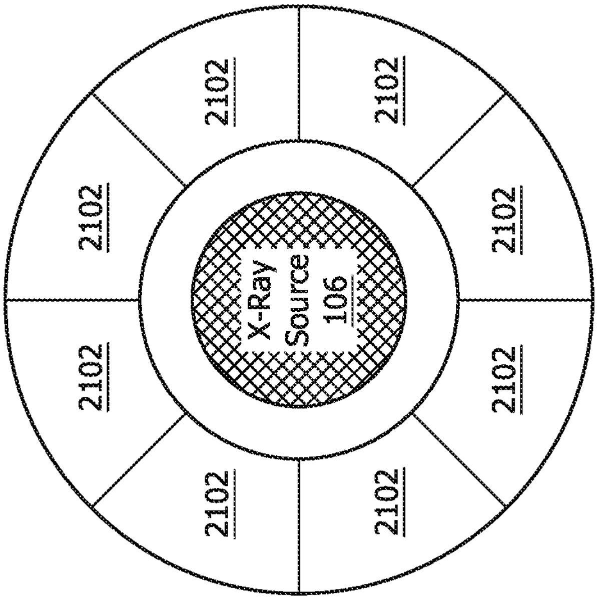
FIGS. 21A-21C are a series of drawings that are useful for understanding how an X-ray beam can be selectively controlled.
Figure 21B:
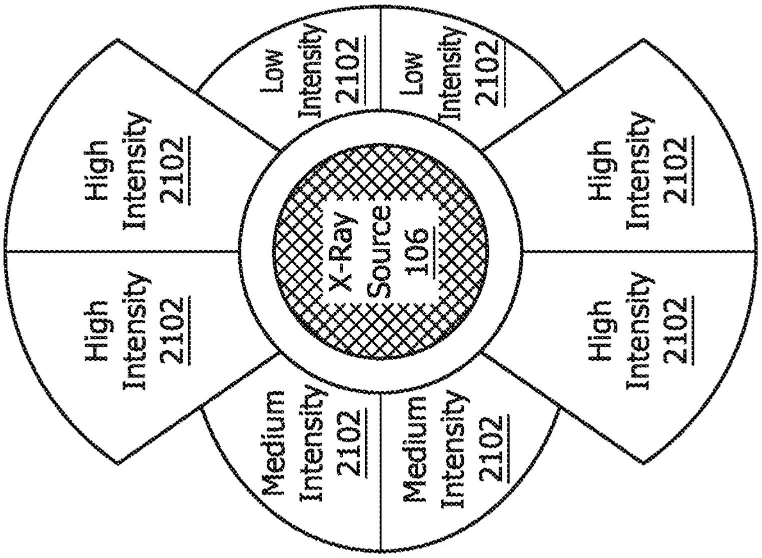
Figure 21C:
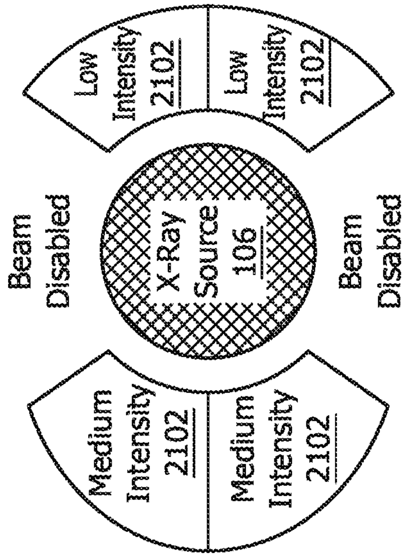

FIGS. 21A-21C are a series of drawings which are useful for understanding the operation of an DCTA as described herein. For convenience, the explanation will proceed with respect to the DCTA disclosed herein with respect to FIGS. 1-8. However, it should be understood that these concepts are similarly applicable to many or all of the DCTA configurations disclosed herein.

FIG. 21A conceptually shows a composite X-ray beam pattern viewed along DCTA centerline 416 in which X-rays can be understood as being uniformly generated in a plurality of radially directed beams beam segments 2102. Such a beam pattern can be produced when the electron beam is diffused or steered to excite all of the segments 414 associated with a target 402. Each of the radial beam segments 2102 is generated by a corresponding beam-former comprising a portion of the DCTA 106. In the scenario illustrated in FIG. 21A, the beam generator is controlled (e.g., with a control system 2000) so that each of the beam segments results in substantially the same X-ray dosage to the treated areas in different azimuth directions relative to the DCTA centerline 416. Further, it can be observed in FIG. 21A that the beam segments 2102 are arranged so that X-ray photons are directed at a plurality of different angles around the DCTA 106 in an arc of about 360 degrees.

The total intensity of the X-ray radiation produced by a DCTA, such as DCTA 106, is approximately proportional to the square of the accelerating voltage. So, in some scenarios, the intensity of an X-ray beam produced at the can be respectively controlled by controlling a voltage potential of the cathode relative to the anode. Independent control over the intensity and direction of each X-ray beam segment 2102 can facilitate selective variations in the composite beam pattern to achieve composite beam patterns, such as the one which is shown in FIG. 21B. The electron beam intensity and/or dwell time can be selectively varied when impinging on different segments of the target to facilitate a desired radiation treatment plan. FIG. 21C illustrates that in some scenarios, beams intensity in certain radial or azimuth directions can be reduced to substantially zero. In other words, the X-ray beam in a particular radial or azimuth direction can be essentially disabled to facilitate a particular radiation treatment plan. Control over the beam generators can be facilitated by a control system (such as control system 2000).

It should be noted that the beam patterns in FIGS. 21A-21C are simplified patterns which are presented in two-dimensions to facilitate a conceptual understanding of the manner in which the beam pattern can be controlled in different radial directions by varying the electron beam intensity and dwell times at different locations on the target. Actual beam patterns produced using this technique are considerably more complex and would naturally comprise a three-dimensional radiation pattern as generally illustrated in FIG. 7. Still, it will be understood that electron beams produced using higher voltage potentials can result in greater X-ray beam intensity in a particular radial or azimuth direction, and electron beams produced using lower voltage potentials will result in lower X-ray beam intensity in a particular radial or azimuth direction. Naturally, the total length of time the X-ray beam is applied in a particular direction will affect the total radiation dose that is delivered in that direction.

Figure 22:
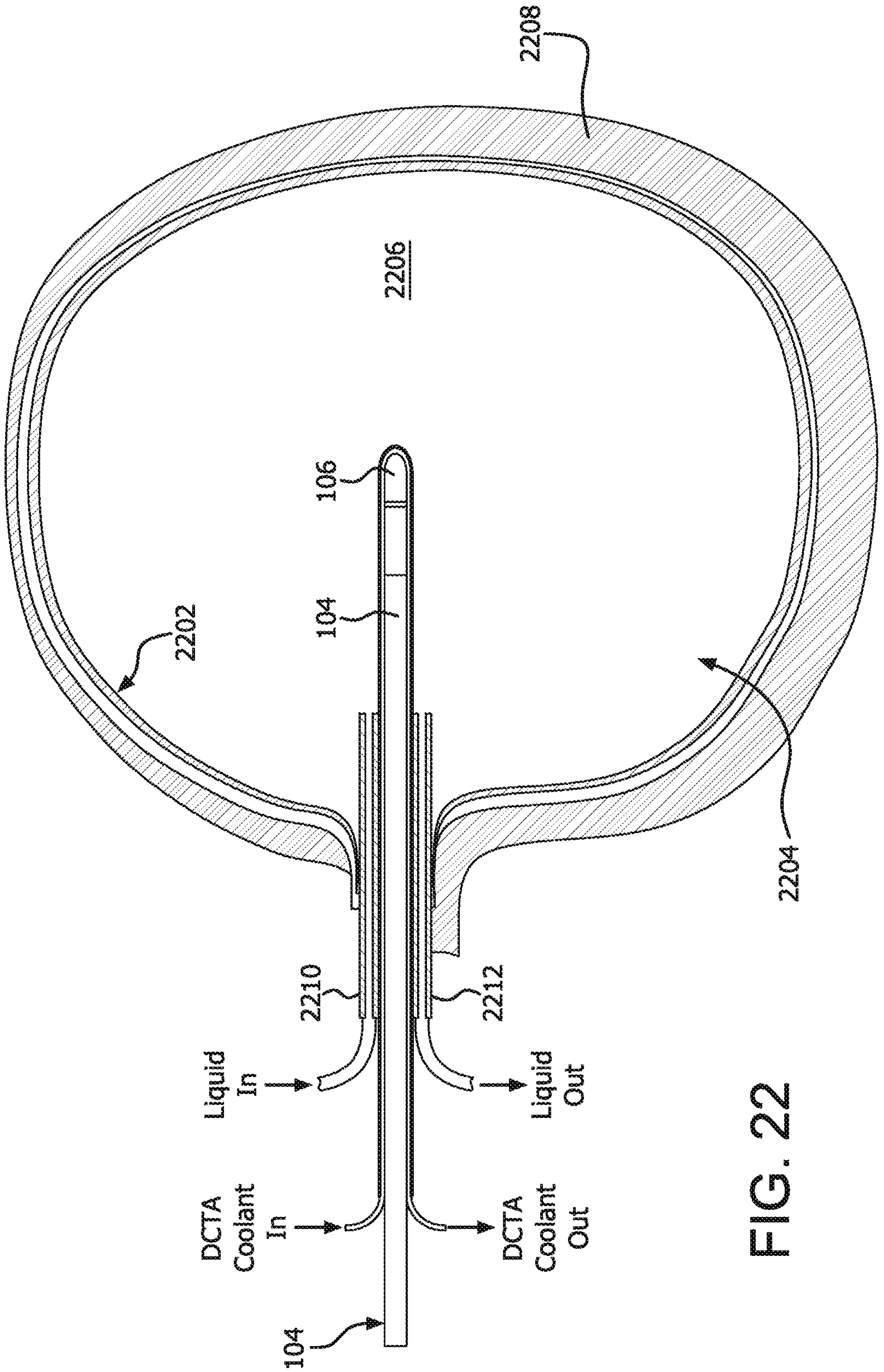
FIG. 22 is a drawing which is useful for understanding how the X-ray source described herein can be used in an IORT procedure.

The intensity of X-rays emitted by a focused electron beam depends strongly on the distance away from the focus. To control the distance of the tissue treatment volume, and to modify the penetrating power of the X-ray beam, it can be advantageous in the case of IORT at least to fill an interstitial space between the X-ray source and a wound cavity with saline fluid. Such an arrangement is illustrated in FIG. 22 which shows that a DCTA 106 can be disposed within a fluid bladder 2202. The fluid bladder can be an elastic balloon-like member which is inflated with a fluid 2206, such as saline, so as to fill an interstitial space 2204 between the X-ray source and a tissue wall 2208 (e.g., a tissue wall comprising a tumor bed). Fluid conduits 2210, 2212 can facilitate a flow of fluid to and from the interior of the fluid bladder. Such an arrangement can help enhance the uniformity of irradiation of the tumor bed by positioning the entire tissue wall a uniform distance away from the X-ray source to facilitate a more consistent radiation exposure.

Figure 23:
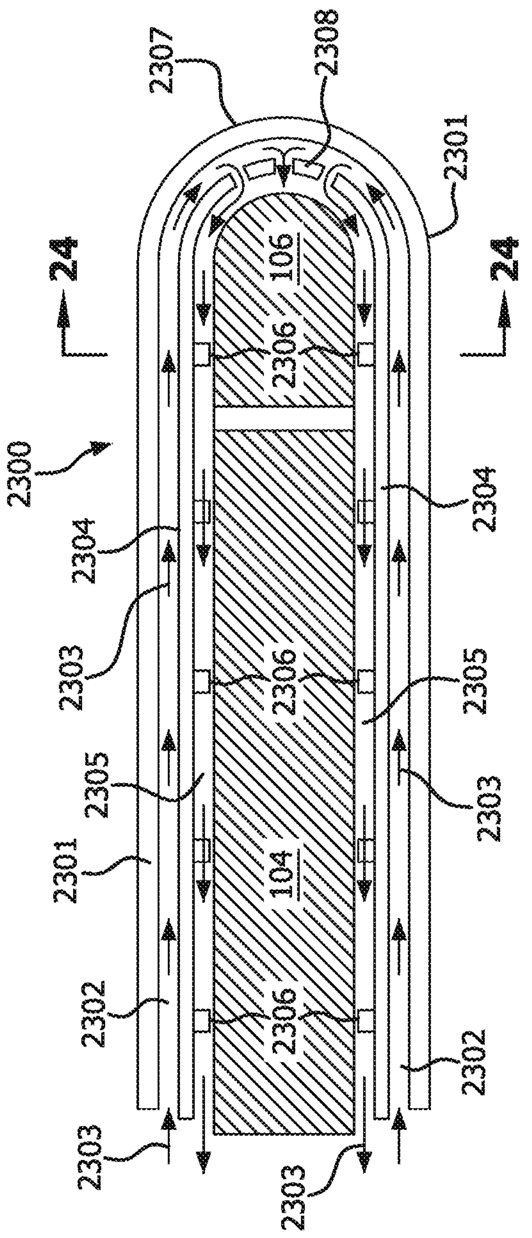
FIG. 23 is a cross-sectional view showing a cooling arrangement for a DCTA.
Figure 24:
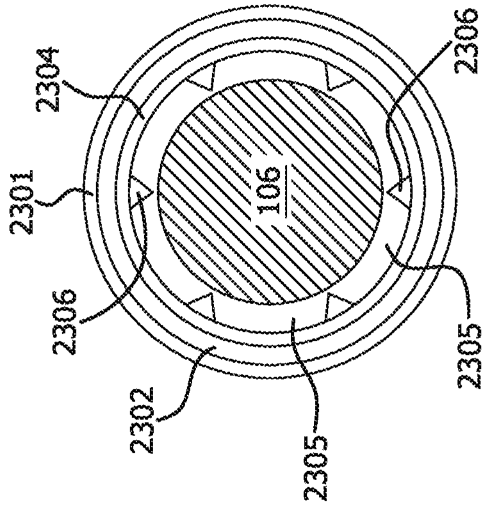
FIG. 24 is a cross sectional view along line 24-24 in FIG. 23.
Figure 25D:
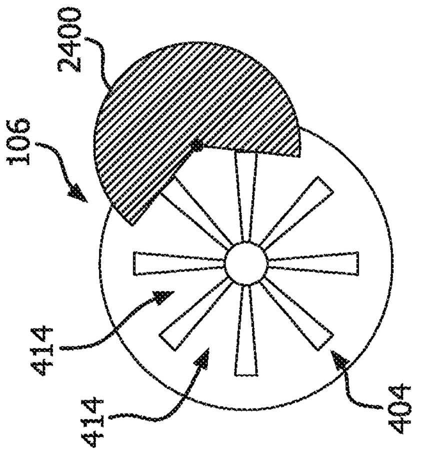
FIGS. 25A-25D are a series of drawings which are useful for understanding a technique for controlling beam width in a DCTA as described herein.
Figure 25C:
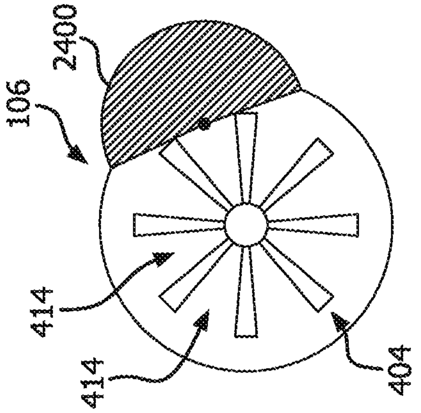
Figure 25B:
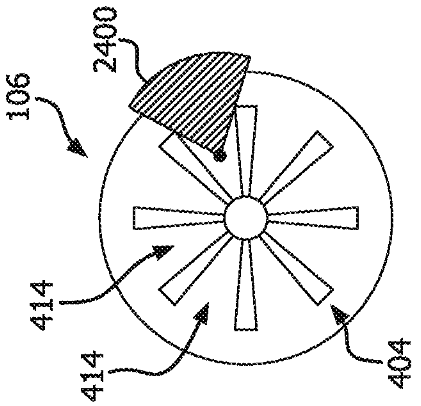
Figure 25A:
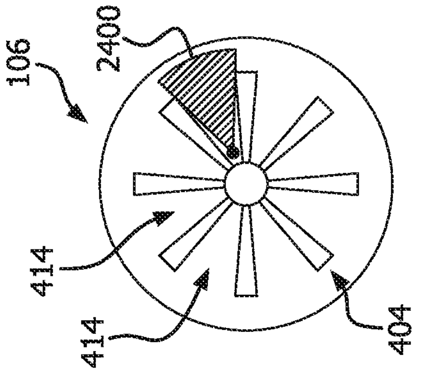

The generation of X-rays at DCTA 106 can generate substantial amounts of heat. So, in some scenarios, in addition to the fluid 2206 which fills the interstitial space 2204, a separate flow of coolant can be provided to the DCTA. One example of such an arrangement is shown in FIGS. 23 and 24. FIG. 23 shows a portion of the drift tube 104 and the DCTA 106. A cooling jacket 2300, which surrounds the drift tube and the DCTA is shown in cross-section to reveal a plurality of coaxial cooling channels 2302, 2305. FIG. 24 is a cross-sectional view of the assembly shown in FIG. 23, taken along line 24-24. It may be understood from FIGS. 23 and 24 that the plurality of coaxial cooling channels can be configured as a sheath which surrounds the DCTA (and portions of the drift tube) and provides a flow of coolant to carry heat away from the DCTA.

More particularly, an outer coaxial cooling channel 2302 is defined by an interstitial space between an outer sheath 2301 and an inner sheath 2304. An inner coaxial cooling channel 2305 is defined by the inner sheath and an outer surface comprising portions of the drift tube 104 and DCTA 106. The inner coaxial cooling channel 2305 is maintained in part by nubs 2306. The nubs maintain a gap between the inner sheath 2304 and outer surfaces of the drift tube 104 and the DCTA 106. When the X-ray source is in operation, coolant 2303 is flowed under a positive pressure toward the DCTA 106 through the outer coaxial cooling channel 2302.

As indicated by the arrows in FIG. 23, the coolant 2303 flows to an end portion 2307 of the cooling jacket where a nozzle part 2308 is provided. In some scenarios the nozzle part 2308 can be integrated with the inner sheath 2304 as shown. Alternatively, the nozzle part can comprise a separate element. The nozzle part 2308 includes a plurality of ports which are arranged to permit coolant 2303 to flow from the outer coaxial cooling channel 2302 to the inner coaxial cooling channel 2305. The nozzle part also serves to direct the flow or spray of coolant onto and around the DCTA 106 so as to provide a cooling effect. This flow, which is indicated by the arrows in FIG. 23 can be in the form of a continuous flow, a spray or a dripping action depending on the coolant flow pressure and the exact configuration of the nozzle part. After cooling the DCTA tip, the coolant 2303 flows along a return path defined by the inner coaxial cooling channel 2305 in the space maintained by the nubs 2306. The coolant 2303 will then exit the inner coaxial cooling channel through an exhaust port (not shown in FIG. 23).

It will be appreciated that a cooling jacket 2300 as shown and described herein is one possible configuration that facilitates cooling of the DCTA. In this regard it should be understood that other types of cooling sheaths are also possible and can be used without limitation. Also, it should be understood that there can be some scenarios where the X-ray source can be operated at reduced voltage levels such that a cooling jacket may not be needed.

Additional control over the X-ray radiation pattern can be obtained by selectively varying where the electron beam impinges upon a particular target segment 414. For example, it can be observed in FIGS. 25A-25D that a beam width of an X-ray beam produced by each beam-former can be adjusted by varying the location where the electron beam strikes a particular target segment. When the electron beam strikes the target segment closest to a centerline of the beam shield 404, a relatively narrow beam is produced by the beam forming compartment. But when the beam is progressively moved radially outward from the centerline in FIGS. 25B-25D, the resulting X-ray beam becomes progressively wider in the azimuth direction. Accordingly, the direction and shape of the resulting X-ray radiation intensity pattern can be selectively controlled. It should be noted that the beam patterns in FIGS. 25A-25D are simplified two-dimensional patterns which are presented primarily to facilitate a conceptual understanding of the manner in which the beam width can be controlled by varying the location where the electron beam striges a particular target segment. Actual beam patterns produced using this technique are considerably more complex and would naturally comprise a three-dimensional radiation pattern similar to that illustrated in FIG. 7.

Figure 26B:
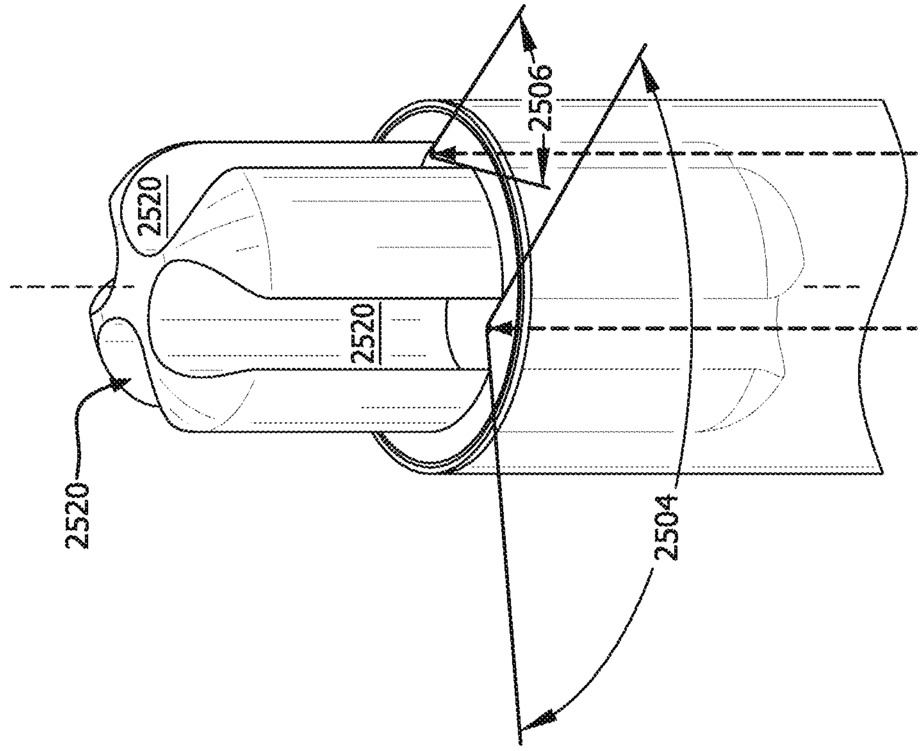
FIGS. 26A-26B show a sixth alternative DCTA configuration and an associated beam steering method.
Figure 26A:
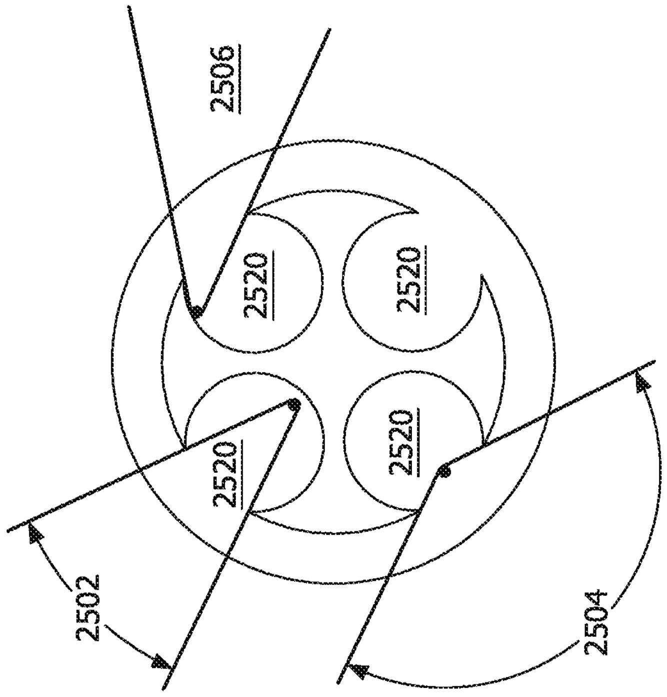

FIGS. 26A-26B illustrate a similar concept but with a beam shield having a different configuration. In FIGS. 26A-26B a beam shield 2504 is comprised of a plurality of compartments 2520 which are semi-circular in profile rather than wedge shaped. As illustrated in FIG. 26A, selectively controlling the location where the electron beam intersects the target can help control whether a relatively narrow X-ray beam 2502 is produced by the beam forming compartment or a relatively wide beam 2504 is produced. As the beam moves radially outward from the centerline of the beam shield 2504, a wider beam is produced.

A further effect shown in FIG. 26A can involve varying the location where the electron beam intercepts the target relative to the wall elements to effectively providing a further method to steer the direction of the X-ray beam produced. As the electron beam is rotated around the periphery of the compartment, the direction of the X-ray beam will be varied.

Figure 27:
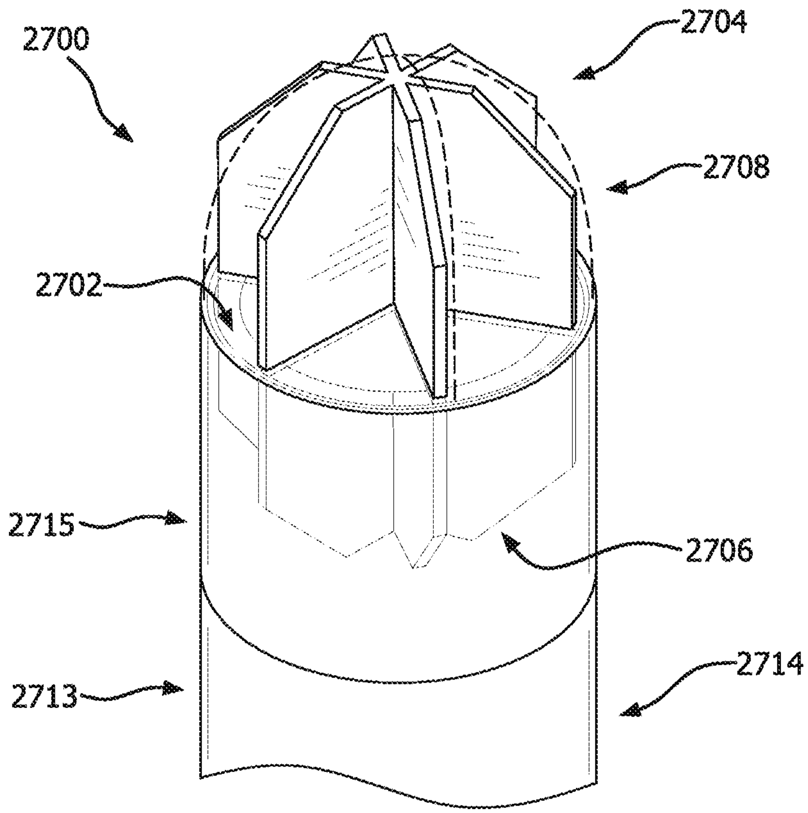
FIG. 27 is useful for understanding how a portion of a drift tube proximal to the DCTA can be formed from an X-ray transmissive material.

Referring now to FIG. 27, a DCTA 2700 can include a beam shield 2704 including a first portion 2706 which is disposed adjacent to one major surface of the target 2702, and a second portion 2708 which is disposed adjacent to an opposing major surface of the target. The first portion 2706 can be disposed internal of the drift tube 2714 within a vacuum environment, and the second portion 2708 can be disposed external of the drift tube. But in some scenarios, a main portion 2713 of the drift tube 2714 can be comprised of a material that absorbs or attenuates X-rays. In such instances it can be desirable to select a material comprising an end portion 2715 of the drift tube to be one that is more highly transmissive to X-ray radiation as compared to the main portion 2713 of the drift tube. In such a scenario, the material comprising the end portion 2715 can be chosen so that it is transparent to X-rays. This arrangement can allow those X-rays which are emitted within the drift tube 2714 to escape the interior without attenuation, thereby providing a desired therapeutic effect.

Alternatively, a DCTA as disclosed herein can be arranged to have a configuration similar to DCTA 1900 which is shown in FIG. 19. The DCTA 1900 includes a tubular main body portion 1920. The tubular main body portion can support at a first end a target 1902 and at an opposing end a coupling ring 1922. The first portion 1906 of the beam shield 1904 extends from a face of the target such that it is disposed within the tubular main body portion 1920. The coupling ring is configured to allow the DCTA 1900 to be secured to the end of a drift tube (e.g., drift tube 104). The coupling ring can facilitate a vacuum seal with a distal end of the drift tube. Accordingly, the interior of the tubular main body portion 1920 can be maintained at the same vacuum pressure as the interior of the drift tube.

The tubular main body portion 1920 can be comprised of an X-ray transmissive material. Consequently, an X-ray beam part which is formed interior of the tubular main body portion is not substantially absorbed or attenuated by the structure of the tubular main body portion 1920. An example of an X-ray transmissive material which can be used for this purpose would include Silicon Carbide (SiC). If SiC is used for this purpose, it can be advantageous to form the coupling ring 1922 from a material such as Kovar, a nickel-cobalt ferrous alloy. Use of Kovar for this purpose can facilitate brazing of the coupling ring to the main body portion. Of course, there may be some scenarios in which it is desirable to attenuate the portion of the X-ray beam which is generated interior of the tubular main body portion 1920. In that case, the tubular main body portion can instead be formed of a material which is highly absorbent to X-ray photons. An example of such a material that is highly absorbent to X-ray photons would include copper (Cu).

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular aspects of the systems and methods described herein and is not intended to be limiting of the disclosure. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method for generating X-ray photons, comprising:
generating an electron beam;
positioning a plurality of hollow pedestals in the path of the electron beam, the plurality of hollow pedestals being radially spaced apart from each other and extending out and away from a major planar face of a base plate;
generating X-ray radiation as a result of an interaction of the electron beam with at least one target element disposed at a distal end of a respective pedestal of the plurality of hollow pedestals;
causing the X-ray radiation to interact with a beam shield comprising a plurality of wall elements extending out and away from the major planar face of the base plate; and
setting at least one of a beam shape and direction of the X-ray radiation by selectively controlling a location where the electron beam intersects the at least one target element to determine an interaction of the X-ray radiation with the plurality of wall elements.

2. The method according to claim 1, further comprising forming the at least one target element of a material selected from the group consisting of molybdenum, gold and tungsten.

3. The method according to claim 1, further comprising causing the electron beam to transit an elongated hollow bore of a drift tube before passing through an aperture formed in the base plate and entering any of the plurality of hollow pedestals.

4. The method according to claim 3, further comprising causing the interaction of the X-ray radiation with the plurality of wall elements to occur within an X-ray transmissive cap disposed at an end portion of the drift tube.

5. The method according to claim 4, wherein the cap defines an inner chamber configured to receive the plurality of wall elements and extends in a direction axially aligned with the bore of the drift tube.

6. The method according to claim 1, further comprising providing a vacuum environment within an interior of each of the plurality of hollow pedestals.

7. The method according to claim 1, wherein a plurality of target elements is disposed at the distal end of the respective pedestal of the plurality of hollow pedestals.

8. The method according to claim 1, wherein each of the plurality of pedestals is aligned with one of a plurality of apertures formed in the base plate and is at least partially located between two of the plurality of wall elements.

9. The method according to claim 1, further comprising arranging the plurality of wall elements so that they extend radially outward from a center of the major planar face of the base plate.

10. The method according to claim 1, wherein each wall element of the plurality of wall elements (i) comprises a first surface that extends adjacent to the base plate in an outwardly radial direction from a center of the base plate to a respective point on or near a perimeter edge of the base plate, (ii) comprises a planar structure that extends out and away from a face of the base plate such that the wall element is disposed in a plane which is orthogonal to another plane which is angled relative to the direction of electron beam travel, and (iii) abuts all other ones of the plurality of wall elements at the center of the base plate.

11. An X-ray source, comprising:
an electron beam generator;
a base plate having a major planar face;
a plurality of hollow pedestals that are radially spaced apart from each other and that extend out and away from the major planar face of the base plate;
at least one target element disposed at a distal end of a respective pedestal of the plurality of hollow pedestals, the at least one target element being responsive to an electron beam produced by the electron beam generator to produce X-ray radiation;
a beam shield comprising a plurality of wall elements extending out and away from the major planar face of the base plate;
wherein at least one of a beam shape and direction of the X-ray radiation is determined by an interaction of the electron beam with the at least one target element and an interaction of the X-ray radiation and the plurality of wall elements.

12. The X-ray source according to claim 11, wherein the at least one target element is comprised of a material selected from the group consisting of molybdenum, gold and tungsten.

13. The X-ray source according to claim 11, further comprising a drift tube partially defining a vacuum chamber, the drift tube having an elongated hollow bore aligned with a direction of the electron beam produced by the electron beam generator.

14. The X-ray source according to claim 13, wherein the electron beam is configured to transit the elongated hollow bore of the drift tube before passing through an aperture formed in the base plate and entering any of the plurality of hollow pedestals.

15. The X-ray source according to claim 13, wherein at least one of the plurality of wall elements is disposed in a chamber defined by an X-ray transmissive cap positioned at an end portion of the drift tube.

16. The X-ray source according to claim 13, wherein the vacuum chamber is at least partially enclosed by the base plate.

17. The X-ray source according to claim 11, wherein each of the plurality of hollow pedestals comprises an interior in which a vacuum environment is providable.

18. The X-ray source according to claim 11, wherein a plurality of target elements is disposed at the distal end of the respective pedestal of the plurality of hollow pedestals.

19. The X-ray source according to claim 11, wherein each of the plurality of pedestals is aligned with one of a plurality of apertures formed in the base plate and is at least partially located between two of the plurality of wall elements.

20. The X-ray source according to claim 11, wherein each wall element of the plurality of wall elements (i) comprises a first surface that extends adjacent to the base plate in an outwardly radial direction from a center of the base plate to a respective point on or near a perimeter edge of the base plate, (ii) comprises a planar structure that extends out and away from a face of the base plate such that the wall element is disposed in a plane which is orthogonal to another plane which is angled relative to the direction of electron beam travel, and (iii) abuts all other ones of the plurality of wall elements at the center of the base plate.

* * * * *